United States Patent [19]

Kim et al.

[11] Patent Number: 5,764,616
[45] Date of Patent: Jun. 9, 1998

[54] DISK REPRODUCING APPARATUS HAVING DISK CHANGING FUNCTION

[75] Inventors: Young-taek Kim, Suwon; Cheol-woong Ahn, Seoul, both of Rep. of Korea

[73] Assignee: Samsung Electronics Co., Ltd., Kyungki-Do, Rep. of Korea

[21] Appl. No.: 723,541

[22] Filed: Sep. 30, 1996

[30] Foreign Application Priority Data

Sep. 30, 1995 [KR] Rep. of Korea ............... 34003
Sep. 30, 1995 [KR] Rep. of Korea ............... 34005

[51] Int. Cl.[6] .................................................. G11B 17/04
[52] U.S. Cl. ................................................................ 369/191
[58] Field of Search .................................. 369/191, 192, 369/34, 36, 38; 360/98.04, 98.06

[56] References Cited

U.S. PATENT DOCUMENTS

| 5,177,722 | 1/1993 | Nakamichi et al. | 369/191 |
| 5,247,500 | 9/1993 | Miyoshi et al. | 369/192 |
| 5,515,357 | 5/1996 | Arata et al. | 369/191 |
| 5,621,708 | 4/1997 | Fujita et al. | 369/192 |
| 5,629,923 | 5/1997 | Hisatomi | 369/191 |

*Primary Examiner*—Stuart S. Levy
*Assistant Examiner*—Allen Cao
*Attorney, Agent, or Firm*—Sughrue, Mion, Zinn, Macpeak & Seas, PLLC

[57] ABSTRACT

A disk reproducing apparatus having a disk changing function is provided where non-selected disks can be exchanged with other disks which are not preloaded as a selected disk is being reproduced, and subtrays remaining on the upper side of a subtray transported from a stocker can be lifted. The lifting mechanism includes a fixing plate having a plurality of guide holes, positioned on the upper side of the stocker and fixed on first and second chassis members, a support plate slidably installed on the upper surface of the fixing plate and having a plurality of support pieces which are provided with support portions at the ends thereof, for supporting the subtrays, respectively, and combined with a plurality of guide holes, respectively, and a manipulating mechanism for transporting a support plate to move the support portions from a first position separated from the subtrays to a second position contacting the bottom surface of the subtrays.

13 Claims, 16 Drawing Sheets

5,764,616

DISK REPRODUCING APPARATUS HAVING DISK CHANGING FUNCTION

BACKGROUND OF THE INVENTION

The present invention relates to a disk reproducing apparatus having a disk changing function and, more particularly, to a disk reproducing apparatus having an improved structure such that non-selected subtrays are prevented from dropping downward inside a stocker when a selected subtray in the stocker is moved to an ejected position outside the main body of the reproducing apparatus or a reproducing position.

A general disk reproducing apparatus having a disk changing function employs a stocker for receiving a plurality of disks. This stocker has a receiving space for receiving the subtrays on which disks are respectively loaded.

However, due to the receiving space required for the stocker, the size of the disk reproducing apparatus is increased, which is disadvantageous for miniaturization of the apparatus.

SUMMARY OF THE INVENTION

To solve the above problem, it is an object of the present invention to provide a disk reproducing apparatus having a disk changing function whose structure is improved so that subtrays can be received in a stocker to be able to slide by each other, when a subtray is moved from the stocker, other subtrays positioned over the selected subtray can be lifted without falling, and miniaturization of the apparatus can be achieved due to the reduction of the disk receiving space.

To accomplish the object, there is provided a disk reproducing apparatus having a disk changing function, comprising a housing having a main deck and first and second chassis members installed at either side of the main deck, a subdeck installed on a rear side of the housing, pivotably supported at one side on the first chassis member, and provided with disk reproducing elements including a turntable for loading a disk thereon and an optical pickup for generating and receiving optical beams, a plurality of subtrays positioned at a front side of the housing, and each having a loading surface on which a disk is loaded, a stocker, for receiving the plurality of subtrays, supported on the first and second chassis members and operative to ascend and descend, a main tray, slidably supported on the first and second chassis members, for transporting one among the plurality of subtrays to be ejected out of the housing, first transporting means for moving the main tray, elevating means for lifting and lowering the stocker to place a selected subtray having a disk loaded thereon on the same level with the main tray, second transporting means for moving the selected subtray placed on the same level with the main tray to the turntable, clamping means for securing the disk loaded on the selected subtray moved to the turntable, and lifting means for lifting any other subtrays remaining at a location above the selected subtray so as to keep the remaining subtrays from falling downward, when the selected subtray is transported to an ejected position out of the housing or onto the turntable by the first and second transporting means.

The lifting means comprises a fixing plate having a plurality of guide holes, positioned on an upper side of the stocker and fixed on first and second chassis members, a support plate slidably installed on an upper surface of a fixing plate and having a plurality of support pieces which are respectively provided with support portions at ends thereof for supporting the subtrays and combined with a plurality of guide holes, respectively, and manipulating means for transporting a support plate to move the support portions from a first position separated from the subtrays to a second position contacting the bottom surface of the subtrays.

The manipulating means comprises a lever member pivotably supported on the fixing plate, one end of which is pivotably connected to the support plate and another end of which is placed on an upper side of the second chassis member, a rotating body connected to the other end of the lever member and rotatably installed on the second chassis member, and rotating means for rotating the rotating body, wherein the support plate is moved by the rotation of the rotating body.

The rotating means comprises a moving member having a recessed portion formed thereon, slidably combined with a first opening formed on a side portion of one side of the main tray, moving means for moving the moving member, and an engaging member positioned on a moving course of the moving member and rotatably supported by the main tray, the engaging member having a lower surface on which a protrusion is formed for slidably contacting an upper surface of the moving member, and an upper surface on which the rotating body is contacted, wherein when the protrusion interlocks with the recessed portion of the moving member, the rotating body is rotated.

According to another aspect of the present invention, the lifting means comprises a fixing plate positioned on an upper side of the stocker and fixed on the first and second chassis members, a plurality of support bodies rotatably installed on the fixing plate and provided with support portions at respective ends thereof for supporting the subtrays, and manipulating means for rotating the support bodies to move the support portions from a first position separated from the subtrays to a second position contacting a bottom surface of the subtrays.

The support bodies are provided at both sides of a peripheral portion of the subtrays and wherein each support body further comprises: a fixing portion on which a centric pin rotatably combined with the fixing plate and an eccentric pin spaced apart from the rotating center are formed; and a combining portion combined with the guide grooves, and wherein the manipulating means comprises a pair of operating plates provided correspondingly on both side peripheral portions of the subtrays, each of said operating plates having slots which are formed perpendicular to each other for slidably combining with the centric pin and eccentric pin, respectively, the operating plates being installed so as to move in the same direction as the subtray, a rotating plate rotatably combined with the fixing plate and rotatably connected to the respective operating plates, and rotating means for rotating the rotating plate, wherein, when the operating plates are horizontally moved by the rotation of the rotating plate, the respective support bodies are rotated so that the support portions thereof support the subtrays.

The rotating means comprises a lever member one end of which is pivotably connected to the rotating plate, a rotating body connected to another end of the lever member and rotatably installed on the second chassis member, a moving member having a recessed portion formed thereon, slidably combined with a first opening formed on a side portion of one side of the main tray, moving means for moving the moving member, and an engaging member positioned on a moving course of the moving member and pivotably supported by the main tray, the engaging member having a lower surface on which a protrusion is formed for slidably contacting an upper surface of the moving member, and an upper surface on which the rotating body is contacted, wherein when the protrusion interlocks with the recessed portion of the moving member, the rotating body is rotated.

According to the present invention, a stocker, in which a plurality of subtrays are received and stacked one on top of another to be capable of sliding by each other, is provided between a disk reproducing position and an ejected position out of the main body of the apparatus such that a disk can be moved in both directions from and to the above positions. Also, when a selected subtray is moved from the stocker, the other subtrays positioned on the selected subtray are lifted by the lifting means so that the selected subtray can be stably transported. Moreover, the subtrays are slidably stacked one on top of another and received in the stocker, which makes the stocker small in size.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
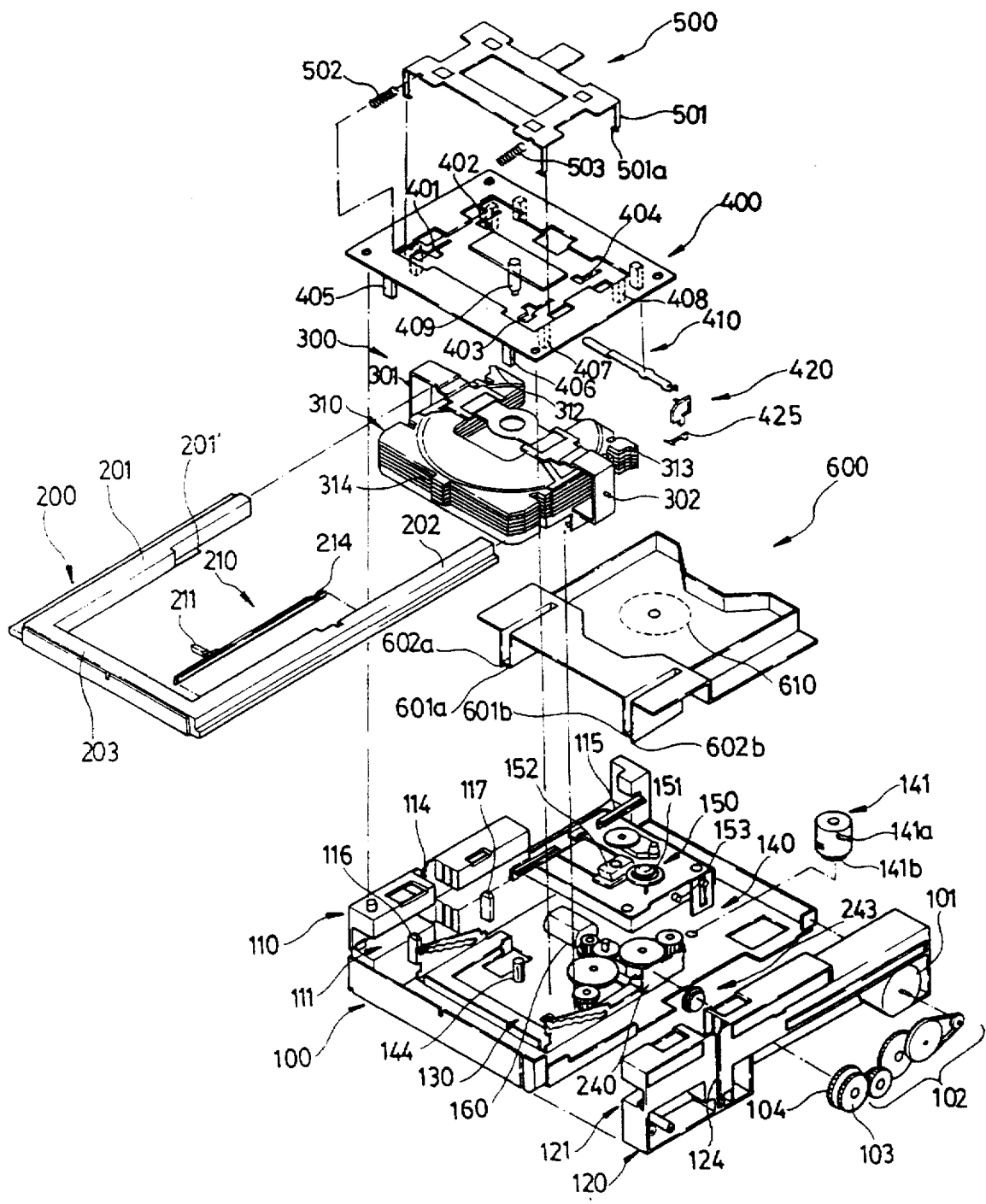
FIG. 1 is an exploded perspective view showing a disk reproducing apparatus having a disk changing function which employs a lifting means for subtrays, according to an embodiment of the present invention.

Referring to FIG. 1, a housing 100 includes a main deck 140 and first and second chassis members 110 and 120 installed opposite each other at the right and left sides of the main deck 140.

A subdeck 150 which is pivotably supported at one side on the first chassis member 110 is installed at the rear side of the inside of the housing 100. Elements for reading and obtaining information from a disk, such as, a turntable 151 for loading a disk (not shown) thereon and an optical pickup 152 having an object lens are provided on the subdeck 150.

A stocker 300 is positioned at the front portion of the inside of the housing 100 and supported by the first and second chassis members 110 and 120 to be able to ascend and descend by a predetermined elevating means. In the stocker 300, a plurality of subtrays 310 having a loading surface 311 (see FIG. 3) for loading a disk thereon are piled on top of one another.

Figure 6:
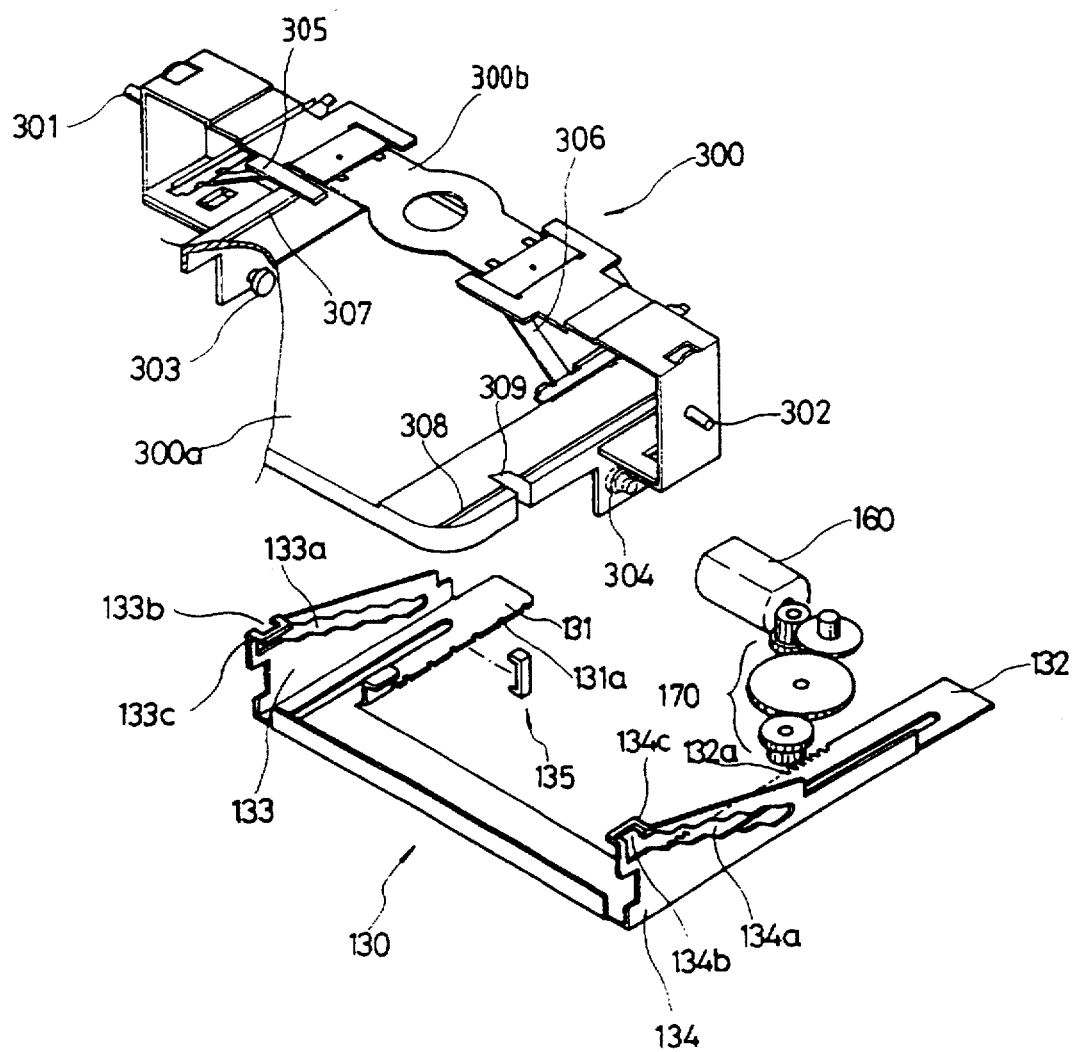
FIG. 6 is a perspective view showing the elevating structure of the stocker employed by the present invention.
Figure 13:
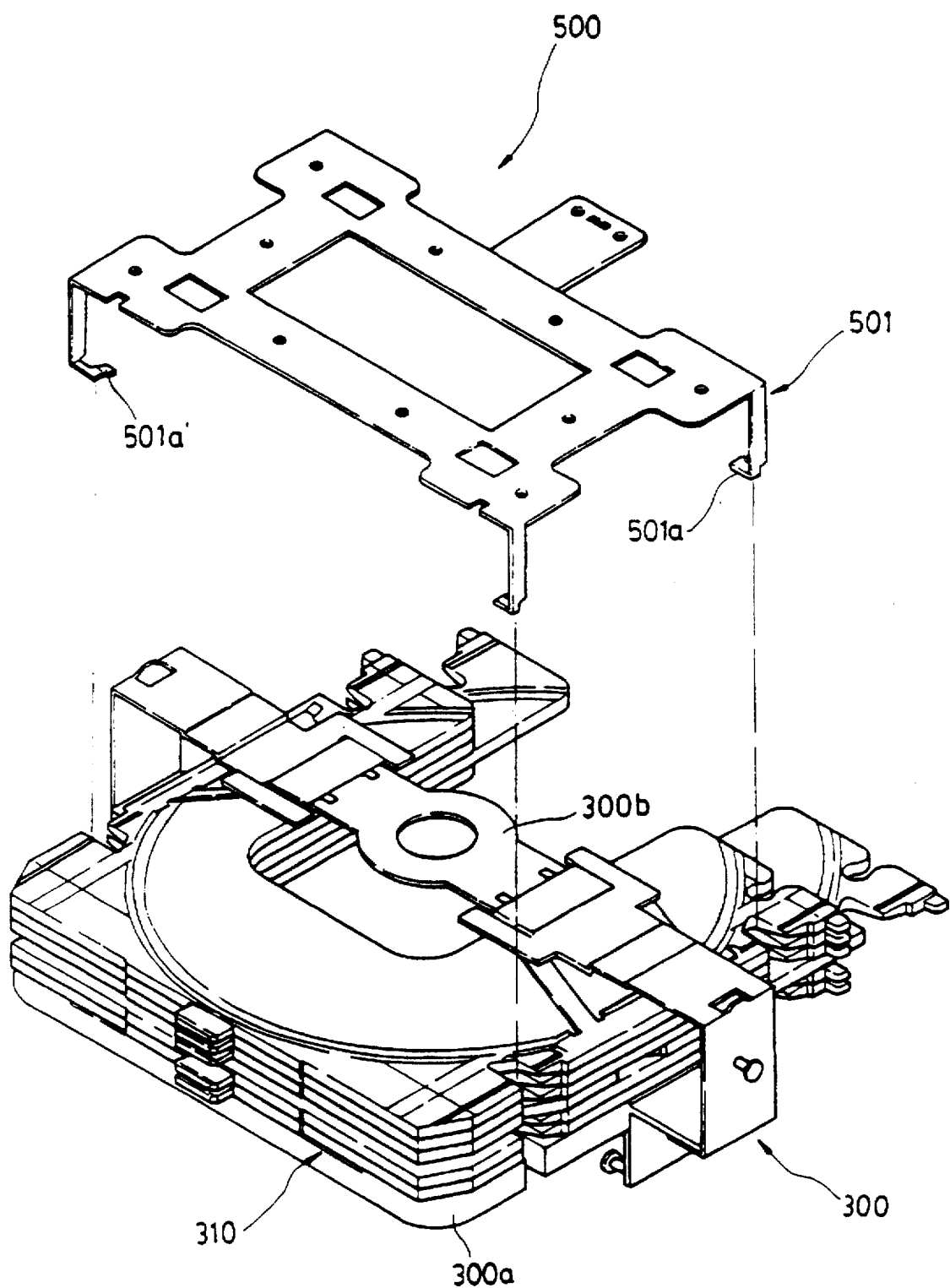
FIG. 13 is a perspective view of the lifting means employed by the present invention.

Meanwhile, as shown in FIGS. 6 and 13, the stocker 300 includes a base portion 300a for seating the subtrays 310 thereon and a support portion 300b fixed to both edges of the base portion 300a to support the base portion 300a on the housing member 100 and to form a passage. Accordingly, the subtrays 310 can move from the stocker 300 toward either direction of the subdeck 150 and an ejected position out of the housing 100. At this time, a moving subtray 310' (see FIG. 15) contacts and slidably moves over subtrays 310 thereunder.

Also, as shown in FIG. 6, springs 305 and 306, pressing down on the upper surface of the uppermost subtray among those piled on the base portion 300a, are installed on the support portion 300b. Guide length grooves 318a and 318b (see FIG. 3) are formed on the bottom surface of the subtray 310, and guide ribs 307 and 308 are formed on the base portion 300a so that they slidably combine with the guide length grooves 318a and 318b.

Referring to FIGS. 1 through 4, the main tray 200 is formed in a "⊏" shape having two arm portions 201 and 202 (FIG. 4) parallel to each other, which are slidably combined with the first and second chassis members 110 and 120, and an intermediate portion 203 connecting the two arm portions 201 and 202 to each other. Support projections 201' and 202' are formed at the sides of the two arm portions 201 and 202, respectively, and a support groove 203' is formed inside the intermediate portion 203.

Figure 3:
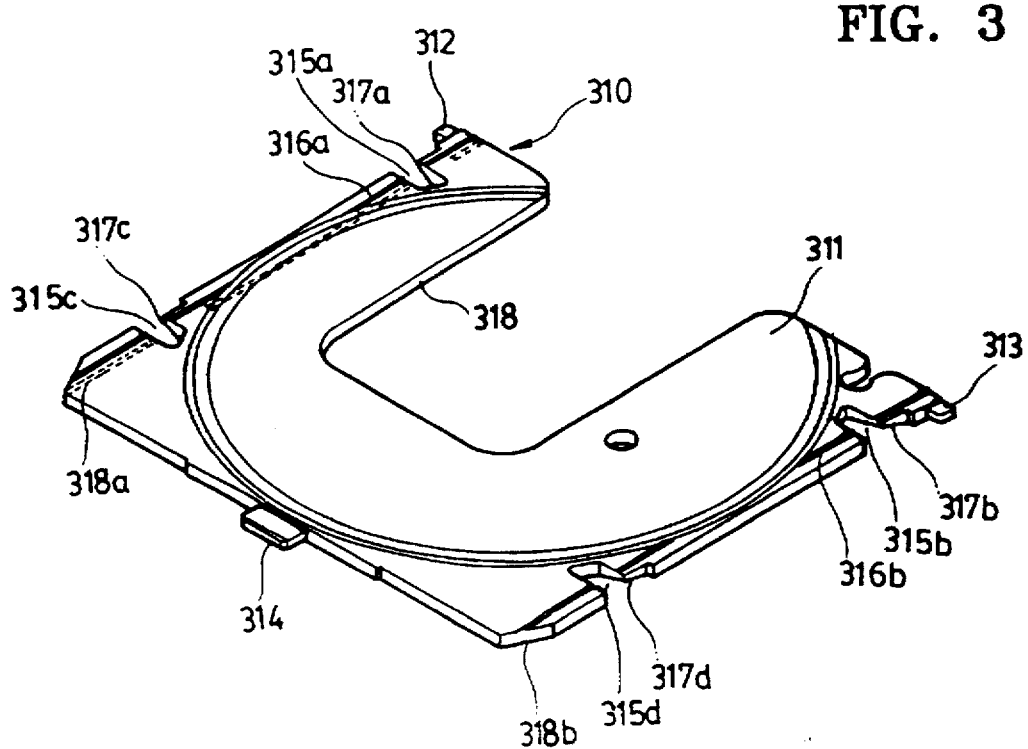
FIG. 3 is a perspective view showing the subtray employed by the present invention.
Figure 4:
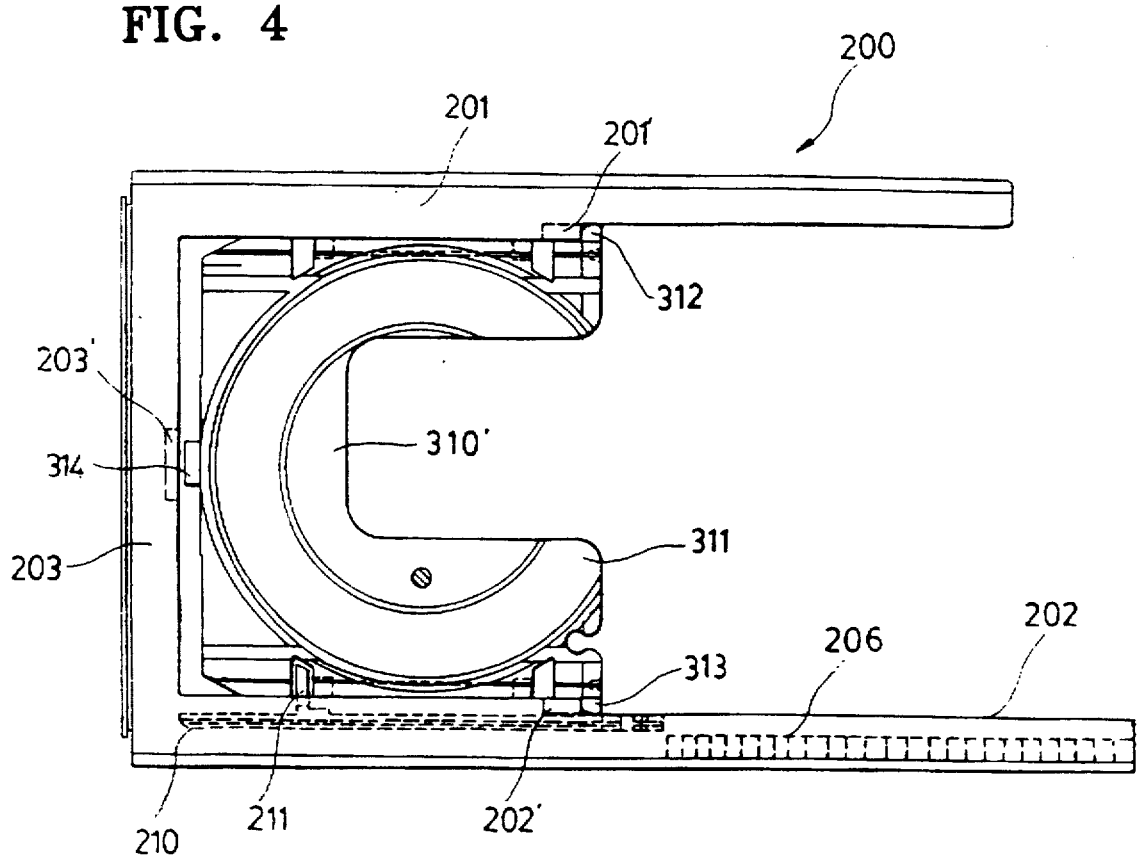
FIG. 4 is a plan view in which the subtray is retained on the main tray, according to the present invention.

Meanwhile, as shown in FIGS. 3 and 4, projections 312 and 313 which are supported by the support protrusions 201' and 202' and a combining projection 314 for combining with the support groove 203' are formed on the subtray 310.

Figure 5:
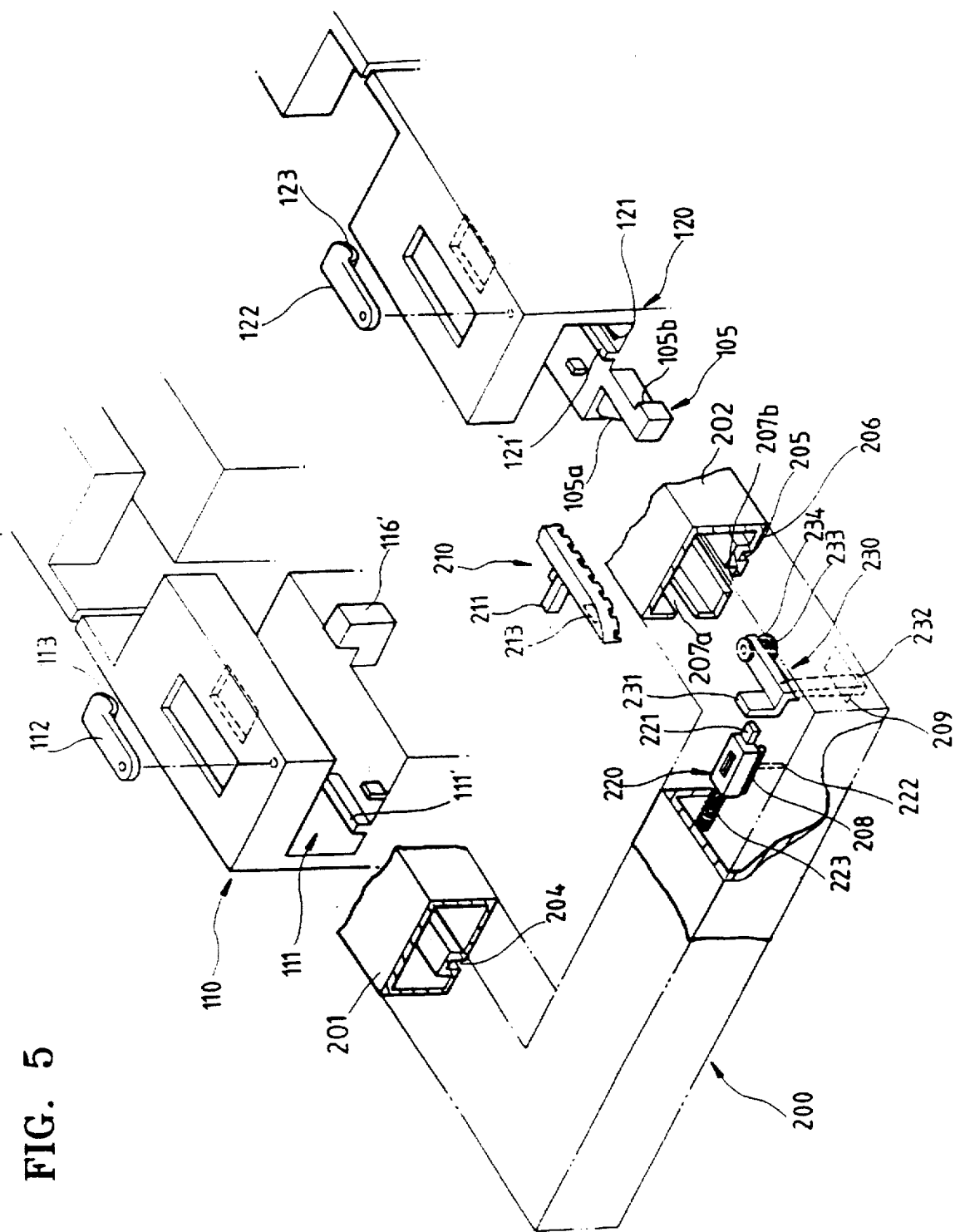
FIG. 5 is a perspective view schematically illustrating the locking structures of the main and subtray shown in FIG. 4.

Also, as shown in FIGS. 1 and 5, the first and second chassis members 110 and 120 have sliding openings 111 and 121 wherein the arm portions 201 and 202 of the main tray 200 slide through and combine with the sliding openings 111 and 121. Guide protrusions 111' and 121' are formed on the lower surfaces of the sliding openings 111 and 121, respectively. Guide grooves 204 and 205 to be slidably coupled to the guide protrusions 111' and 121' are formed on the bottom surfaces of the arm portions 201 and 202 of the main tray 200, respectively. Here, the arm portions 201 and 202 of the main tray 200 are inserted to and combined with the inside of the stocker 300.

Referring to FIG. 5, plates 112 and 122 which are elastically deformable are fixed on the first and second chassis members 110 and 120, respectively, at the ends of which rollers 113 and 123 are rotatably supported, contacting the upper surfaces of the arm portions 201 and 202 of the main tray 200. Thus, due to the use of the rollers 113 and 123, the main tray 200 can be stably moved without upward or downward shaking.

The main tray 200 is ejected outside of the housing 100, together with one of the plurality of subtrays 310, by a first transporting means.

The first transporting means is constructed as follows. Referring to FIG. 1, a gear train 102 which is driven by the power of a motor 101 and first and second gears 103 and 104 installed on the same shaft are provided on the second chassis member 120. The first gear 103 meshes with a rack gear 206 (see FIG. 4) formed on the bottom surface of the arm portion 202 of the main tray 200.

Referring to FIGS. 1 and 6, the elevating means for lifting and lowering the stocker 300 has the following structure. First and second vertical guide slots 114 and 124 are formed on the first and second chassis members 110 and 120, respectively. A slide member 130 having parallel horizontal portions 131 and 132 and vertical portions 133 and 134 is slidably installed on the main deck 140. The vertical portions 133 and 134 respectively having first and second stepped slots 133a and 134a are formed from the edges of the horizontal portions 131 and 132. A rack gear 132a is formed on the horizontal portion 132 of the slide member 130. Also, a motor 160 and a gear train 170 for connecting the motor 160 to the rack gear 132a are installed on the main deck 140.

First and second guide pins 301 and 302 for coupling to the first and second vertical guide slots 114 and 124 and first and second combining pins 303 and 304 for combining with the first and second stepped slots 133a and 134a are formed on both side portions of the stocker 300.

Thus, when the slide member 130 is moved forward and backward by the driving force of the motor 160, the stocker 300 ascends and descends.

The first and second stepped slots 133a and 134a have a staircase shape and have the same number of steps as the number of subtrays 310 which are received by the stocker 300. Also, a plurality of grooves 131a is formed at constant intervals on the horizontal portion 131 of the slide member 130. The number of grooves 131a is also determined by the number of subtrays 310 to be received in the stocker 300. A sensor 135 for sensing the passing of the grooves 131a is installed on the main deck 140. Accordingly, while the stocker 300 ascends and descends by the slide member 130 which is moved by the driving force of the motor 160, the sensor 135 performs a sensing operation to a given groove 131a, and, at the same time, power applied to the motor 160 is interrupted.

Meanwhile, first and second extension pieces 133c and 134c having first and second horizontal holes 133b and 134b linked with the first and second stepped slots 133a and 134a are formed on the vertical portions 133 and 134 of the slide member 130. At this time, the first and second extended pieces 133c and 134c are formed at right angles to the vertical portions 133 and 134.

When a subtray 310' (see FIG. 16), on which a disk is loaded (the disk being omitted for clarity), selected from the plurality of subtrays 310 which are lifted and lowered by the predetermined elevating means is positioned on the same plane with the main tray 200, a second transporting means transports the subtray 310' to the turntable 151, i.e., to a reproducing position.

Thus, the first and second combining pins 303 and 304 can be combined with the first and second stepped slots 133a and 134a through the first and second horizontal holes 133b and 134b. That is, the vertical portions 133 and 134 of the slide member 130 do not need to be elastically deformed, in order to combine the first and second combining pins 303 and 304 with the first and second stepped slots 133a and 134a.

Referring to FIGS. 1 through 5, the second transporting means is constructed as follows. A plurality of guide grooves 315a to 315d (FIG. 3) are formed at the peripheral portions of the subtray 310. A moving member 210 is slidably coupled to main tray 200. A protrusion 211 (FIG. 5) is formed on the moving member 210 for combining with the guide groove 315d, and a rack gear portion 212 is formed on the bottom surface of the moving member 210. A first opening 207a through which the protrusion 211 of the moving member 210 protrudes and a second opening 207b through which the rack gear portion 212 thereof is, as shown in FIG. 5, protruded are formed on the main tray 200. Here, the rack gear portion 212 engages with the second gear 104 (FIG. 1). Thus, the moving member 210 can be moved with respect to the main tray 200 by the driving force of the motor 101. In addition, since the protrusion 211 of the moving member 210 is combined with the guide groove 315d of the subtray 310, the subtray 310 can move according to the movement of the moving member 210.

Also, a guide means is provided for guiding the subtray 310 from the stocker 300 to the turntable 151.

Referring to FIGS. 1 and 3, the guide means includes guide ribs 316a and 316b formed at either side on the upper surfaces of the subtray 310, guide length grooves 318a and 318b formed on the bottom surfaces thereof, and guide rails 115, to which the guide length grooves 318a and 318b of the subtray 310 slidably combine, formed on the first and second chassis members 110 and 120.

Meanwhile, a first locking means is provided for locking the moving member 210 (FIG. 1) to the main tray 200 and releasing the lock. When the moving member 210 is locked to the main tray 200, a selected subtray 310' (FIG. 15) is moved with the main tray 200 to thus be ejected outward from the housing 100. On the other hand, when the moving member 210 is unlocked from the main tray 200, the subtray 310 can be moved to a reproducing position with the moving member 210. At this time, the main tray 200 is locked to the housing 100.

The first locking means is constructed as follows. Referring to FIG. 5, a locking groove 213 is formed on one side surface of the moving member 210. A fixing protrusion 105 having a sloped surface 105a is formed on the end portion of the chassis member 120. A moving block 220, on which a releasing pin 222 engaging with the sloped surface 105a and a locking protrusion 221 combining with the locking groove 213 of the moving member 210 are formed, is slidably combined with the main tray 200 in a direction perpendicular to the moving direction of the moving member 210. A spring 223 for elastically biasing the moving block 220 toward the moving member 210 is combined with the inside of the main tray 200. The releasing pin 222 protrudes through a guide length hole 208 formed on the main tray 200.

According to the configuration of the first locking means, when the main tray 200 moves toward the housing 100, the releasing pin 222 is guided onto the sloped surface 105a. At this time, the moving block 220 is moved to compress the spring 223, and the locking protrusion 221 separates from the locking groove 213 of the moving member 210. On the other hand, when the main tray 200 is ejected from the housing 100, the releasing pin 222 separates from the fixing protrusion 105, and, at the same time, the moving block 220 moves toward the moving member 210 by the restoring force of the spring 223. At this time, the locking protrusion 221 of the moving block 220 combines with the locking groove 213 of the moving member 210.

Meanwhile, a second locking means for locking the main tray 200 to the housing 100 is constructed as follows. The second locking means prevents the main tray 200 from being accidentally ejected from the housing 100.

Referring to FIG. 5, a locking projection 105b is formed on the fixing protrusion 105. A pivoting lever 230 having a locking piece 232 for locking with the locking projection 105b is pivotably supported by a hinge pin 234 inside the main tray 200. A torsion spring 233 for elastically biasing the pivoting lever 230 is provided to maintain a locked state of the locking piece 232 to the locking projection 105b. Also, a releasing piece 231 for releasing the locked state by interlocking with the moving member 210 is formed on the pivoting lever 230. Here, the locking piece 232 protrudes through a hole 209 formed on the main tray 200.

According to the above configurations of the first and second locking means, the elasticity of the spring 223 is stronger than that of the torsion spring 233. Thus, with the main tray 200 being ejected from the housing 100, the moving block 220 is moved toward the pivoting lever 230 by the spring 223. At this time, the pivoting lever 230 is in a pivoted state, while elastically deforming the torsion spring 233.

Referring to FIG. 1, a clamping means for securing a disk loaded on the turntable 151 has the following structure.

The subdeck 150 is supported at one side by the first chassis member 110, and pivotable by a predetermined pivoting means. A fixing block 600, on which a clamping member 610 for pressing down on the upper surface of the disk loaded on the turntable 151 is supported, is fixed on the first and second chassis members 110 and 120. The fixing block 600 is provided with slide length grooves 601a and 601b to which the guide ribs 316a and 316b (FIG. 3) of the subtray 310 slidably combine and guide projections 602a and 602b for guiding both sides of the subtray 310.

When the subdeck 150 is moved upward by the pivoting means, the disk is secured between the turntable 151 and clamping member 610.

The pivoting means for moving the subdeck 150 upward and downward is constructed as follows.

Figure 7:
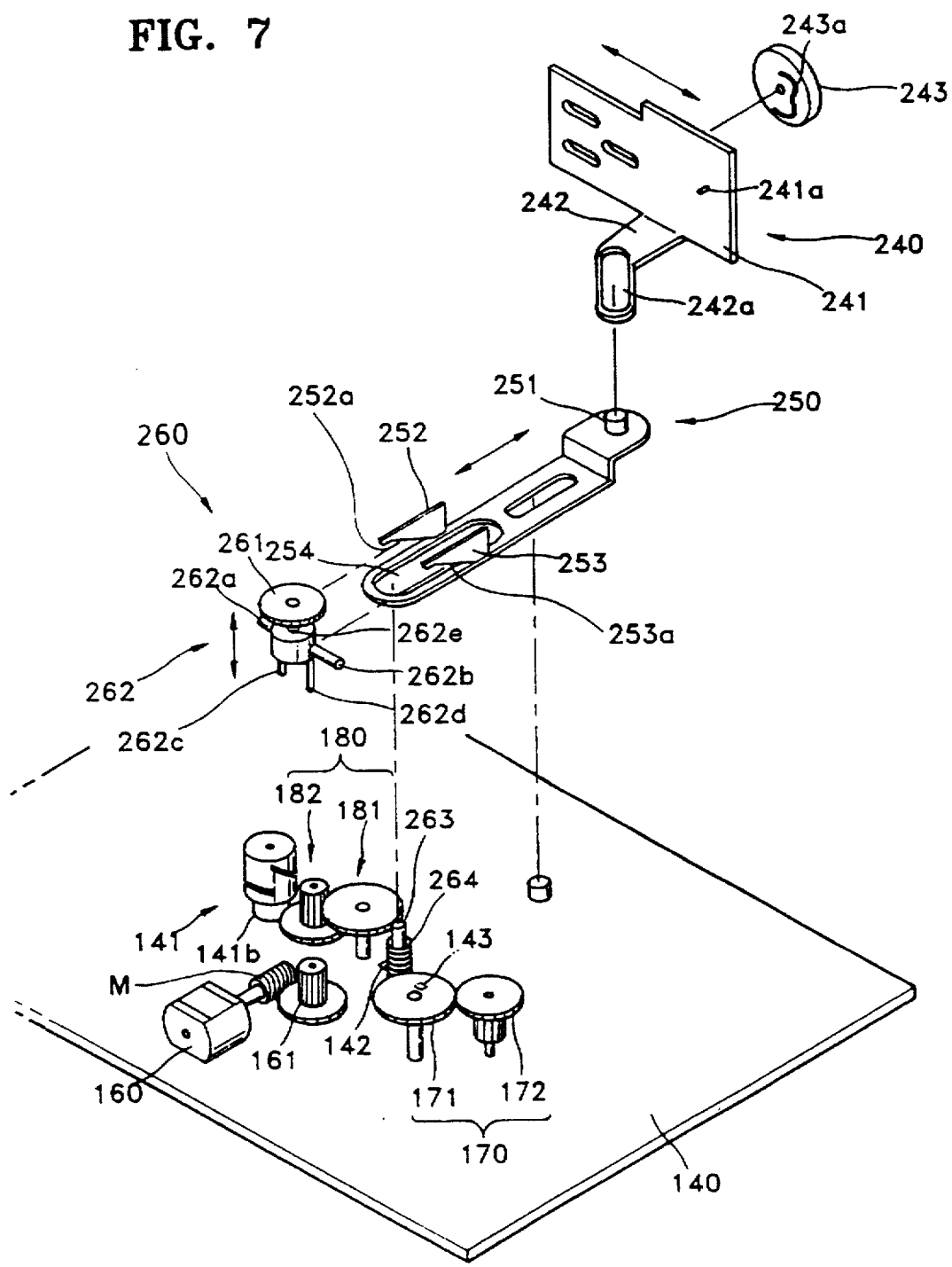
FIG. 7 is a extracted perspective view showing the essential parts of a clutch means employed by the present invention.

Referring to FIGS. 1 and 7, a cam pin 153 is formed on the free end of the subdeck 150. Also, a cylindrical cam member 141 having a cam groove 141a to which the cam pin 153 is slidably coupled and a gear 141b is rotatably installed on the main deck 140. The cam groove 141a is formed on the outer circumferential surface of the cam member 141, and the gear 141b is formed on the bottom surface thereof. Also, the motor 160 and a gear train 180 for connecting the motor 160 to the gear 141b of the cam member 141 are installed on the main deck 140. Thus, if the cam member 141 is rotated by the driving force of the motor 160, the subdeck 150 moves upward or downward.

Meanwhile, the elevating means for raising and lowering the stocker 300 and the pivoting means for pivoting the subdeck 150 are operated by a clutch means for selectively transmitting the driving force of the motor 160 thereto.

Referring to FIGS. 1 and 7, the clutch means is constructed as follows.

A driving gear 161 which rotates by being connected to the motor gear M of the motor 160 is installed on the main deck 140, at one side of which a dual gear 182 for connecting to the gear 141b of the cam member 141 and a first connecting gear 181 are installed. Also, a dual gear 172 for connecting to the rack gear 132a of the slide member 130 and a second connecting gear 171 are installed at the other side of the driving gear 161 on the main deck 140. The second connecting gear 171 is installed at a relative position lower than the first connecting gear 181.

A clutch gear assembly 260 having a clutch gear 261 which selectively engages with one of the first and second connecting gears 181 and 171 is installed so as to be able to ascend and descend by a predetermined operating means. The clutch gear 261 is installed so as to be able to ascend and descend with respect to the main deck 140 in engagement with the driving gear 161.

The operating means is constructed as follows.

A slide plate 240 having a vertical portion 241 slidably supported on the second chassis member 120 and a horizontal portion 242 provided with an angled slot 242a is supported on the second chassis member 120 such that it can slide forward and backward on the housing 100 by a predetermined driving means. Also, a link member 250 is installed on the main deck 140 so as to be able to move perpendicular to the moving direction of the slide plate 240. The link member 250 includes a pin 251 which is combined with the angled slot 242a, a lengthwise slot 254 formed along the length of the link member 250, and extended pieces 252 and 253 having sloped portions 252a and 253a and extended from the borders of both sides of the lengthwise slot 254.

A shaft 263, which protrudes through the lengthwise slot 254 of the link member 250 and on which the clutch gear assembly 260 is ascendably and descendably combined, is fixedly installed on the main deck 140. A spring 264 for elastically biasing the clutch gear assembly 260 toward the sloped portions 252a and 253a of the extended pieces 252 and 253 is combined with and positioned around the shaft 263.

The clutch gear assembly 260 includes a clutch gear 261 and an elevating member 262 provided with a boss 262e rotatably combined with the clutch gear 261 and extended protrusions 262a and 262b which contact the sloped portions 252a and 262b, respectively.

Meanwhile, a means for preventing rotation upon the ascent and descent of the elevating member 262 is further provided in which two guide posts 262c and 262d are formed extending from the bottom surface of the elevating member 262, and guide holes 142 and 143 into which the guide posts 262c and 262d are slidably combined are formed on the main deck 140.

The driving means for transporting the slide plate 240 is constructed as follows. Referring to FIGS. 1 and 7, a motor 101 for generating a driving force is installed on the outer side of the second chassis member 120. The motor 101 is the power source for transporting the main tray 200. Also, a cam gear 243 which is rotated by the driving force of the motor 101 is installed on the inner side of the second chassis member 120. A cam groove 243a (FIG. 7) is formed on the cam gear 243. A cam pin 241a which combines with the cam groove 243a is formed on the slide plate 240. The cam gear 243 is installed on the same shaft as the first and second gears 103 and 104. Thus, the slide plate 240 is moved forward and backward by the rotation of the cam gear 243. Also, the link member 250 interlocked with the slide plate 240 is moved perpendicular to the moving direction of the slide plate 240. At this time, the clutch gear assembly 260 ascends and descends by interlocking with the extended pieces 252 and 253. Thus, the clutch gear 261 is selectively engaged with the first and second connecting gears 171 and 181.

Meanwhile, when the selected subtray 310' is moved to the turntable 151 or an ejected position out of the housing 100 by the first and second transporting means, a lifting means needs to be provided to lift the other subtrays 310 remaining over the selected subtray 310'.

Referring to FIGS. 1, 2A–2B, and 8 through 11, the lifting means is constructed as follows. A plurality of guide holes 401 through 404 are formed on the fixing plate 400. Also, a support plate 500 for supporting the subtrays 310 is installed on the upper surface of the fixing plate 400, and can be moved by a predetermined manipulating means. The support plate 500 is connected to the fixing plate 400 by a spring 502 and a spring 503. Also, a plurality of support pieces 501 which combine with the plurality of guide holes 401 through 404, respectively, are formed on the support plate 500. On each end portion of the support pieces 501, a folded support portion 501a is formed to support the subtrays 310. Referring to FIG. 3, the support pieces 501 are coupled with the guide grooves 315a to 315d of the subtrays 310, respectively. Also, sloped surfaces 317a to 317d which the support portions 501a respectively support are formed on the edges of the subtrays 310. Further, the support portions 501a (FIG. 13) are formed with slant surfaces 501a' corresponding to the sloped surfaces 317a to 317d. The manipulating means serves to move the support plate 500 to transfer the support portions 501a from the guide grooves 315a to 315d of the subtrays 310 to the sloped surfaces 317a to 317d.

The manipulating means is constructed as follows. A lever member 410 (FIG. 1) is pivotably supported on the bottom surface of the fixing plate 400. One end of the lever member 410 is pivotably connected to the support plate 500, and the other end thereof is positioned on the upper portion of the second chassis member 120. Also, a rotating body 420 connected to the other end of the lever member 410 is installed on the second chassis member 120, and can be moved by a predetermined rotating means.

Figure 2A:
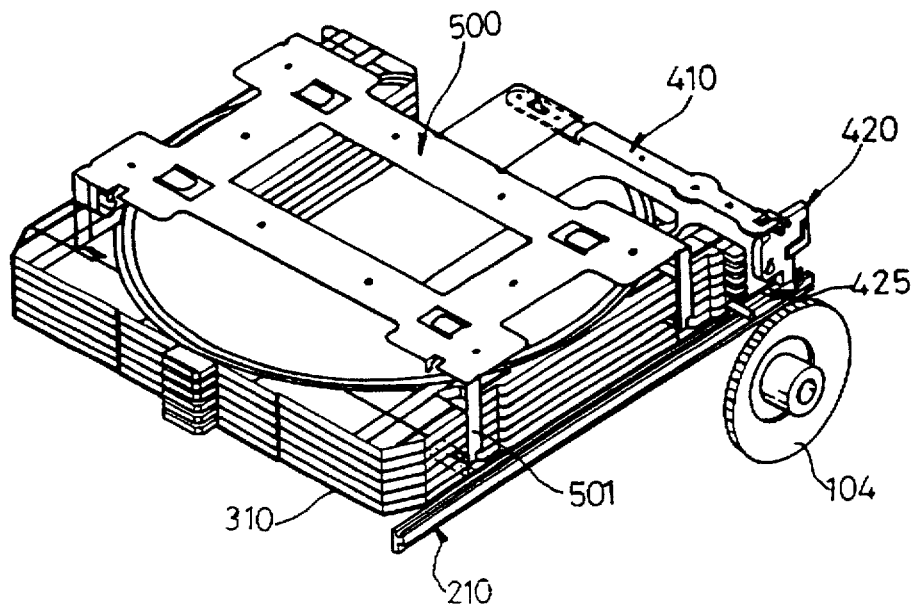
FIGS. 2A and 2B are views showing the operation of the lifting means shown in FIG. 1.
Figure 2B:
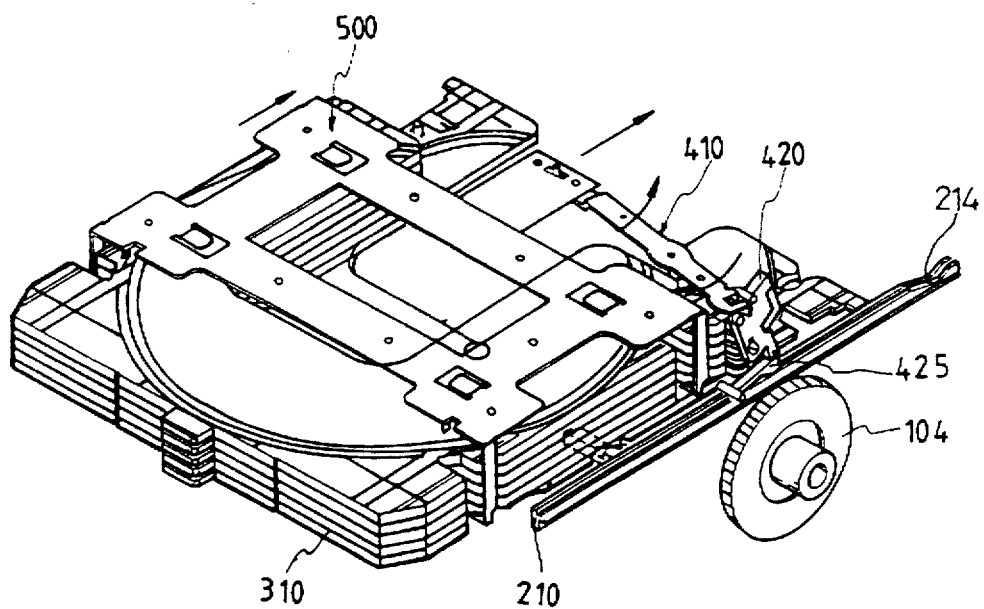

The rotating means is constructed as follows. A recessed portion 214 (FIGS. 8 and 9) is formed on the upper surface of the moving member 210 slidably combined with the main tray 200. The moving member 210 is transported in engagement with the second gear 104 which is rotated by the driving force of the motor 101. An engaging member 425, on which a protrusion 425a slidably contacting the upper surface of the moving member 210 is formed, is rotatably supported inside the main tray 200. The rotating body 420 contacts the upper surface of the engaging member 425. The rotating body 420 is elastically biased by a torsion spring (not shown) to press down on the upper surface of the engaging member 425. Thus, when the protrusion 425a interlocks with the recessed portion 214 of the moving member 210, the rotating body 420 is rotated. At this time, the lever member 410 is rotated, thereby moving the support plate 500 in a certain direction as shown in FIG. 2B.

Referring to FIG. 6, springs 305 and 306 for elastically pressing down on the upper surface of the subtray 310 are installed on the stocker 300. The springs 305 and 306 keep the plurality of subtrays 310 stacked on top of one another stable.

Meanwhile, a departure preventing means is provided for preventing the departure of the plurality of subtrays 310 supported on the stocker 300.

The departure preventing means is constructed as follows. Referring to FIGS. 1 and 3, an opening 318, into which the turntable 151 enters, is formed on the subtray 310. A first post 144 is installed perpendicular to the main deck 140, and a second post 409 aligning with the first post 144 is formed on the bottom surface of the fixing plate 400. The free ends of the first and second posts 144 and 409 maintain an interval through which only one of the piled subtrays 310 can pass.

Figure 12:
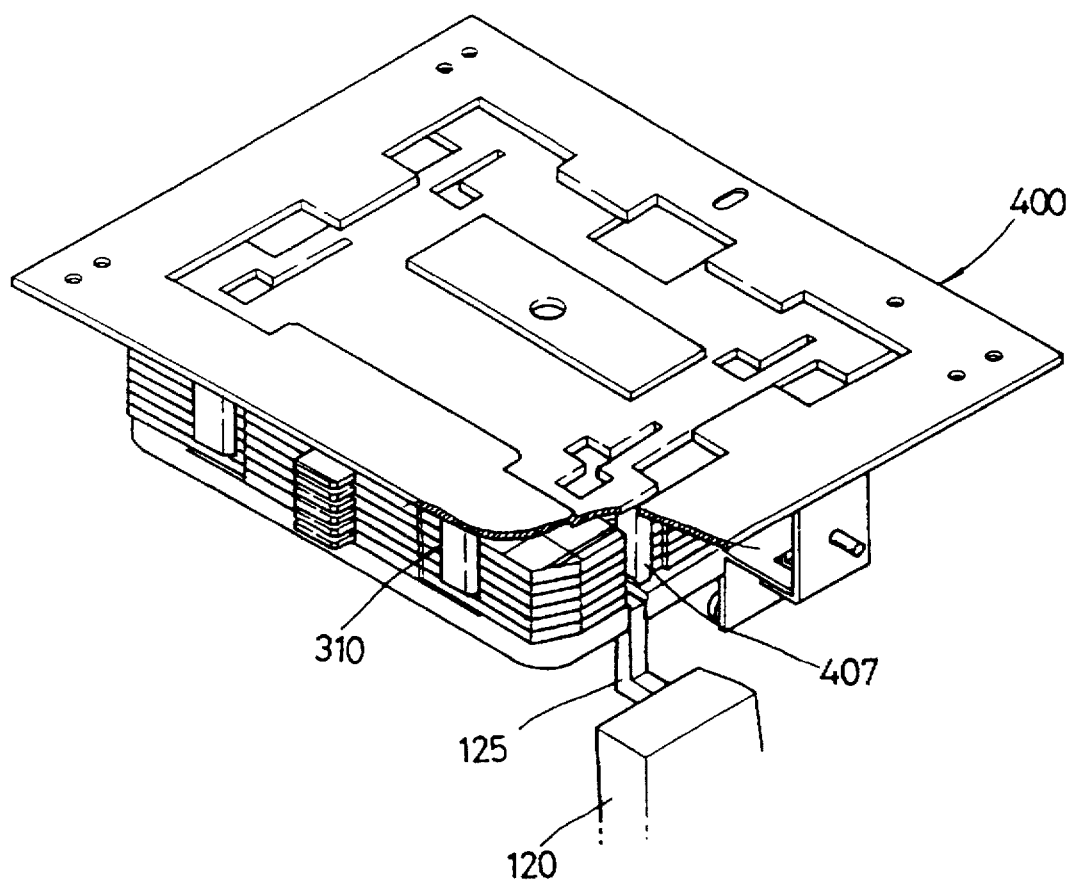
FIG. 12 is a perspective view showing subtrays stacked on the stocker shown in FIG. 6.

Meanwhile, extended protrusions 405 and 406 supporting the front and back edges of the piled subtrays 310 and combining protrusions 407 and 408 combining with the guide grooves 315a through 315d of the subtray 310 to support the edges of the subtray 310 are formed on the bottom surface of the fixing plate 400. Also, auxiliary protrusions 116, 117 and 125 (FIGS. 1 and 12) which are coupled to the guide grooves 315a to 315d (FIG. 3) of the subtrays 310 through combining grooves 309 of the stocker 300 are formed on the inner sides of the first and second chassis members 110 and 120, respectively.

The interval between the auxiliary protrusions 116, 117 and 125 formed on the first and second chassis members 110 and 120 and the combining protrusions 407 and 408 formed on the fixing plate 400 is the same as that of the first and second posts 144 and 409. Furthermore, the interval of the former is formed at the same position as that of the latter.

Meanwhile, the lifting means according to another embodiment of the disk reproducing apparatus having a disk changing function according to the present invention will be explained with respect to its structure with reference to FIGS. 17 through 22, wherein components corresponding to those shown in previous drawings are designated by the same reference numerals. A fixing plate 700 (FIG. 17) fixed on the first and second chassis member 110 and 120, located over the stocker 300, has a plurality of combining holes 705 through 708. A plurality of support bodies 850, 860, 870, and 880 are rotatably supported on the combining holes 705 through 708, respectively. The respective support bodies 850, 860, 870, and 880 each have a support portion 853 (FIG. 18) (only one of which support portion 853 is in full view in the drawing) for supporting the subtrays 310, formed on the respective ends thereof. Also, a manipulating means is further provided for rotating the respective support bodies 850 through 880 to transport the corresponding support portion 853 separated from the subtray 310 to the location where the support portion contacts the bottom surface of the subtray 310.

The guide grooves 315a through 315d (see FIG. 3) into which the plurality of support bodies 850 to 880 are inserted are formed on the subtray 310, the same as in the previous embodiment. Also, according to the present embodiment, a plurality of protrusions 317e (see FIG. 19A) which are supported by the support portion 853 are further formed on the peripheral portions of the guide grooves 315a through 315d of the subtray 310.

Each of the support portions 853 is provided with a sloped surface 853a (FIG. 18) sloped at a predetermined angle such that it can easily enter and slide on the bottom surfaces of the protrusion 317e.

The manipulating means is constructed as follows. The support bodies 850 through 880 each has a fixing portion 851 on which a centric pin 851a rotatably is combines with the fixing plate 700 (FIG. 17) and an eccentric pin 851b, which is spaced apart from the rotating center, are formed, a combining portion 852 for combining with a corresponding one of the guide grooves 315a through 315d of the subtray 310, and the support portion 853.

Also, a pair of operating plates 830 and 840 (FIG. 18) are provided corresponding to the side borders of the subtray 310 on the bottom side of the fixing plate 700, each of the operating plates 830 and 840 having slots 831 and 832 which are formed at right angles with respect to each other and slidably combined with the centric pin 851a and eccentric pin 851b, respectively. Also, the operating plates 830 and 840 have guide length slots 833, 834 and 843, 844, respectively, for slidably combining with guide pins 701 through 704 formed on the fixing plate 700.

A rotating plate 820 which is rotatably connected to the respective operating plates 830 and 840 is rotatably combined with the bottom surface of the fixing plate 700 by a predetermined rotating means. The rotating plate 820 is provided with a wing 821 and a plurality of wings 822 and 823 respectively connected to the operating plates 830 and 840.

According to the operation of the manipulating means having such a configuration, when the operating plates 830 and 840 are moved horizontally by the rotation of the rotating plate 820, the support bodies 850, 860, 870 and 880 are rotated so that the support portions 853 support the subtrays 310.

Figure 18:
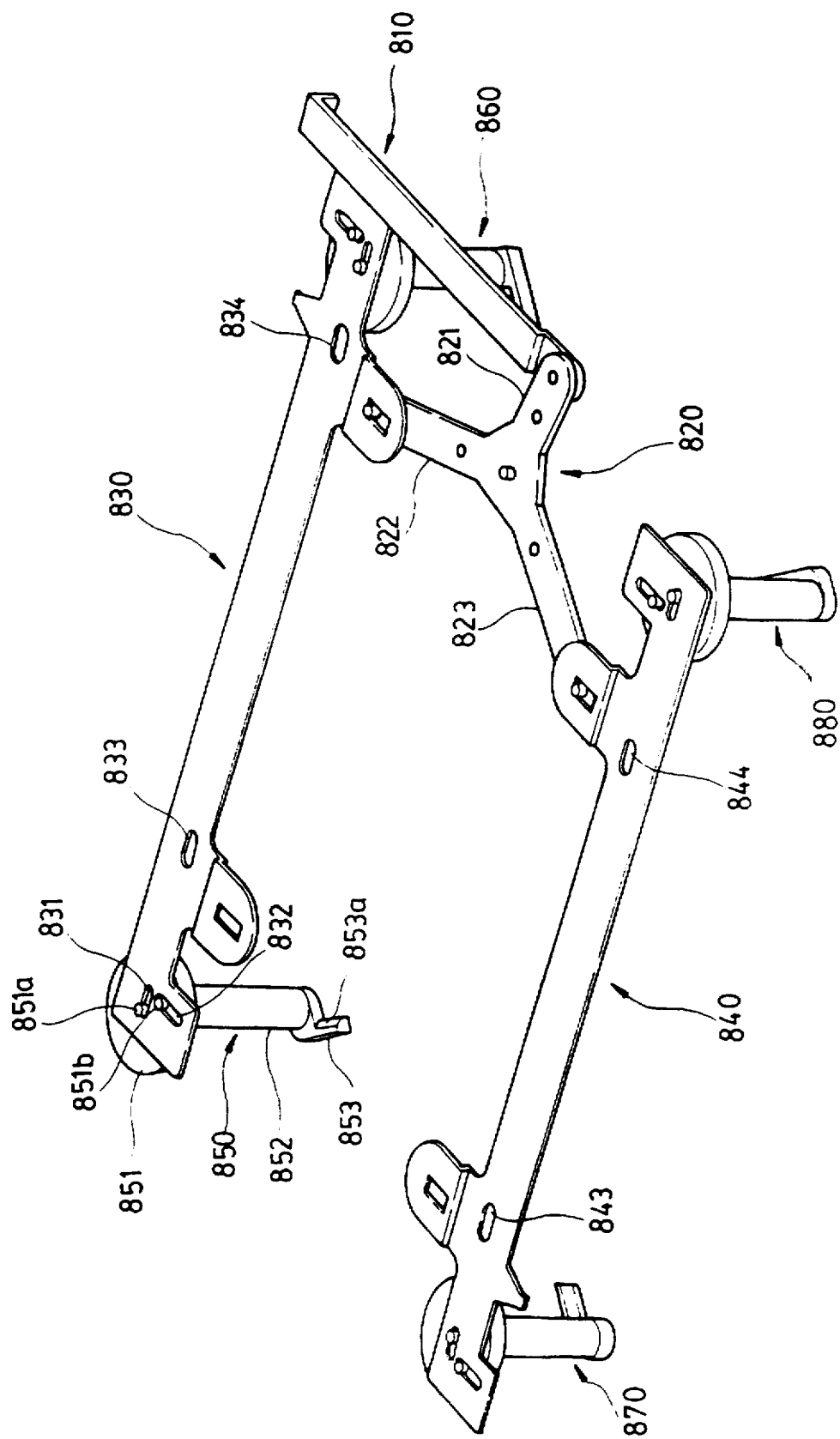
FIG. 18 is a detailed perspective view showing the lifting means of FIG. 17.
Figure 19A:
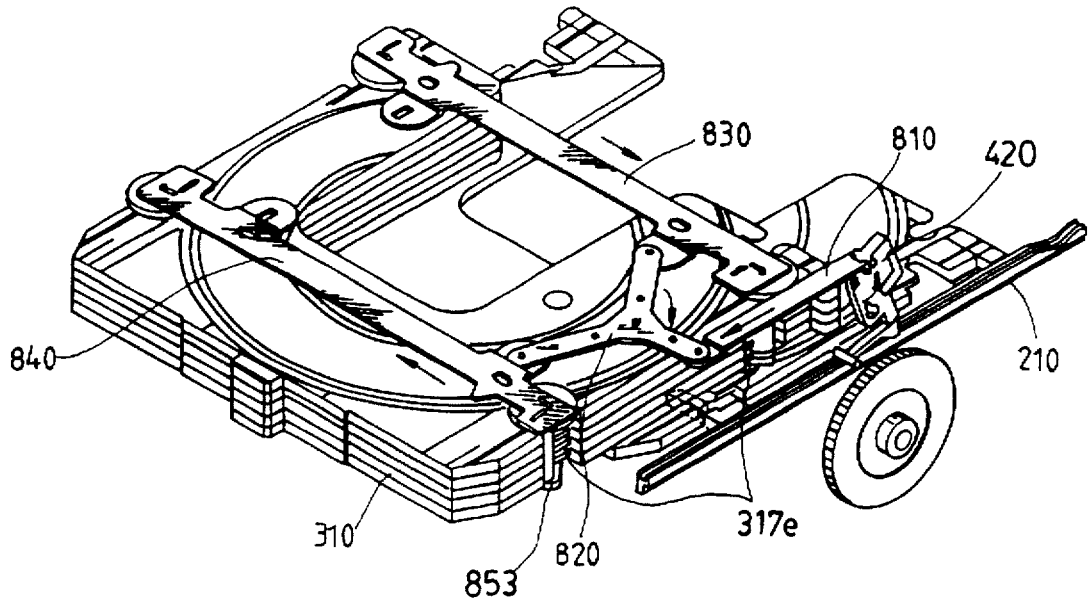
FIGS. 19A and 19B show the operation of the lifting means shown in FIG. 17 according to the other embodiment of the present invention.
Figure 19B:
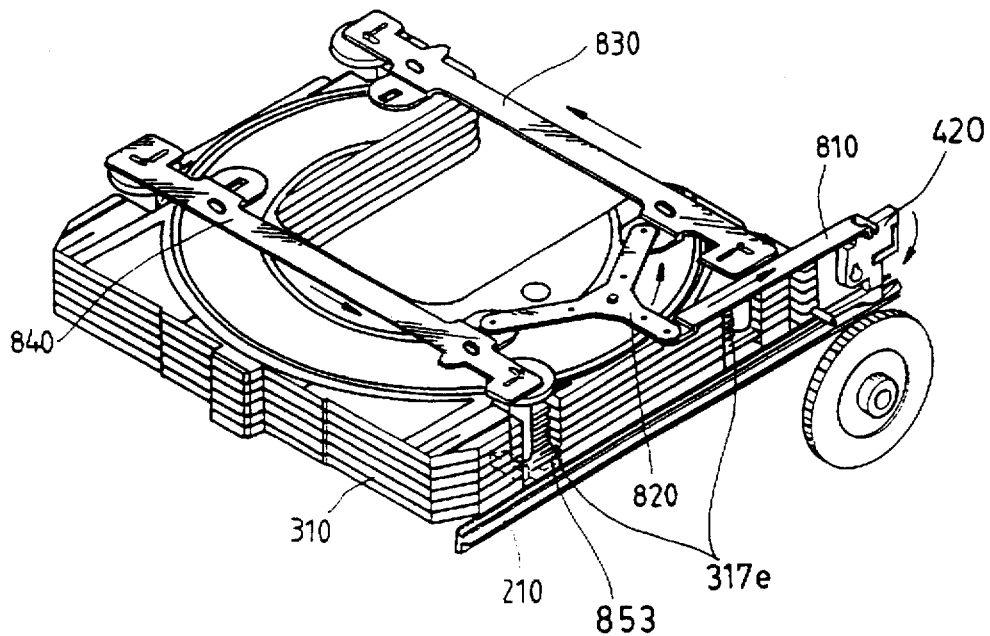

Referring to FIGS. 18, 19A and 19B, the rotating means includes a lever member 810, one end of which is rotatably connected to the wing 821 of the rotating plate 820 and the other end of which is placed over the second chassis member 120, and a rotating body 420 connected to the other end of the lever member 810 and rotatably installed on the second chassis member 120.

Hereinbelow, the operation of the disk reproducing apparatus having a disk changing function according to the present invention will be described in detail with reference to the attached drawings.

A disk loading operation of moving a selected disk to be loaded on the turntable 151 is as follows. Referring to FIGS. 1, 5, 15 and 16, the main tray 200 is locked into the housing 100 as described above.

Figure 14:
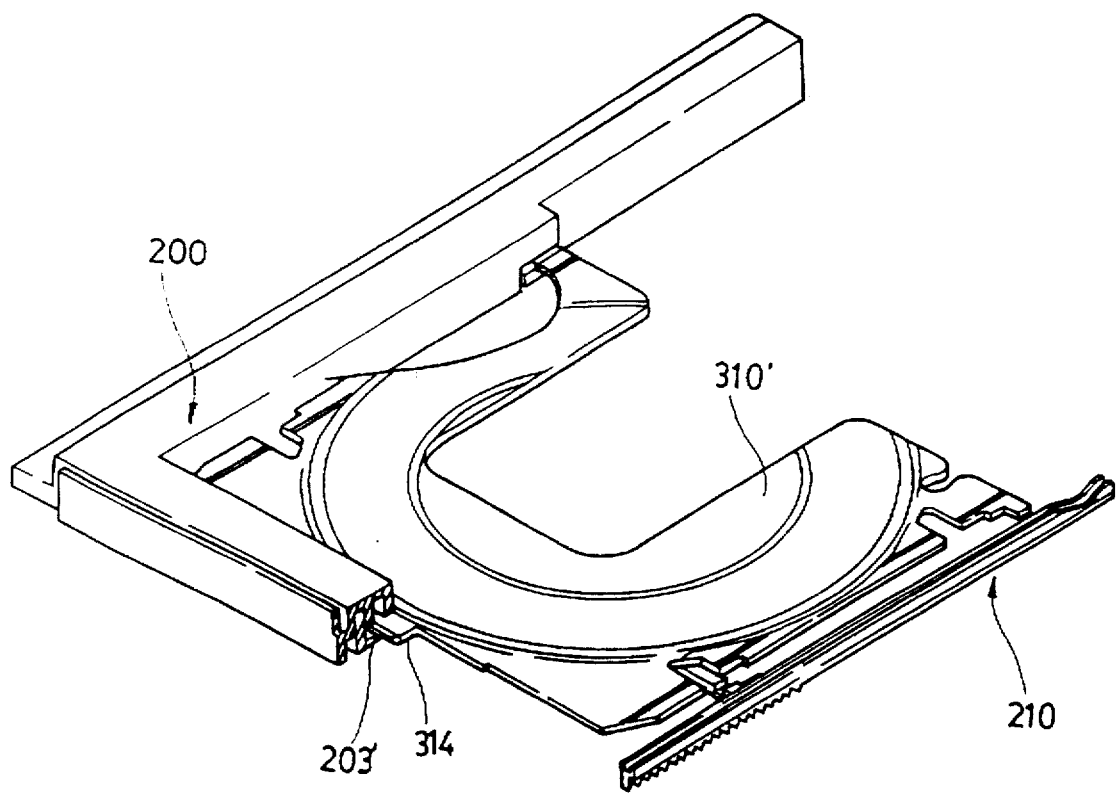
FIG. 14 is a perspective view showing a subtray retained by the main tray, as shown in FIG. 4.
Figure 15:
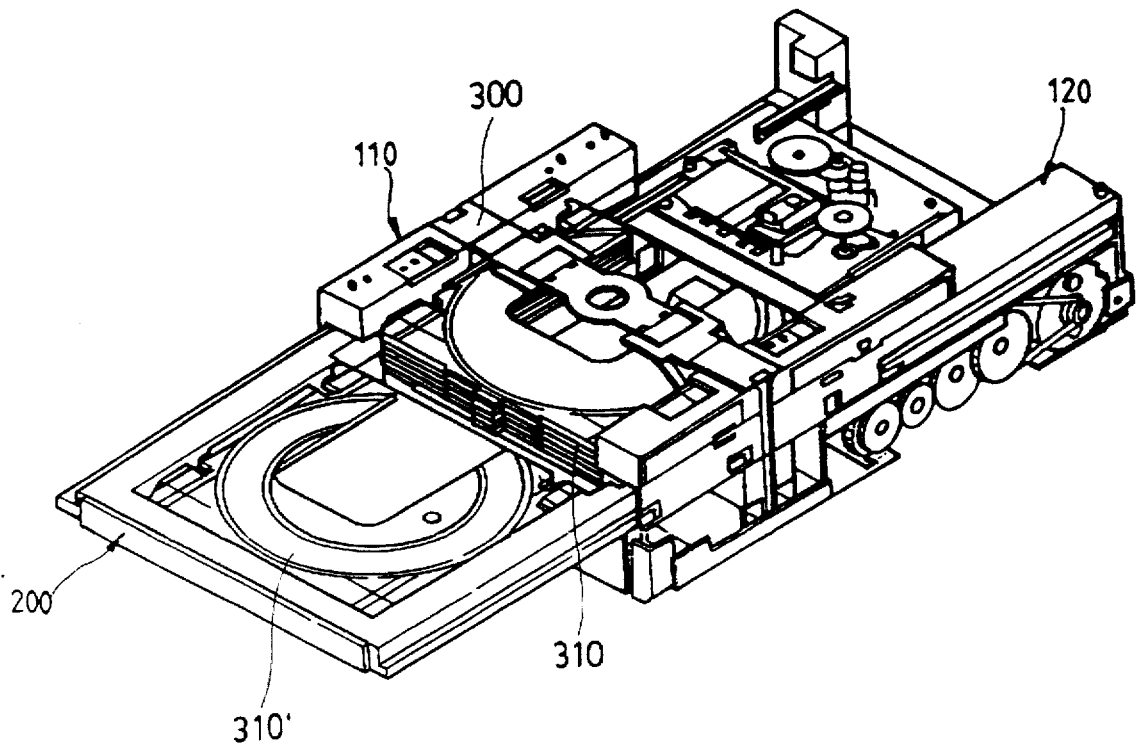
FIG. 15 is a perspective view showing the assembled disk reproducing apparatus of FIG. 1, which shows the main tray and a subtray which are ejected out of the disk reproducing apparatus.

That is, the main tray 200 is moved to the inside of the housing 100 by the driving of the motor 101. At this time, as shown in FIG. 15, the main tray 200 is in combination with one of the subtrays 310'. Referring to FIG. 14, the combining projection 314 of the subtray 310' is combined with the support groove 203' of the main tray 200, and projections 312 and 313 of the subtrays 310 are supported on the support projections 201' and 202' (see FIG. 4). Also, the moving member 210 (FIG. 5) is locked into the moving block 220 provided at the front side of the main tray 200. At this time, the locking protrusion 221 of the moving block 220 is in combination with the locking groove 213 of the moving member 210. The moving block 220 is elastically biased toward the pivoting lever 230 by the spring 223, whereby the pivoting lever 230 is pivoted to a side direction.

Figure 9:
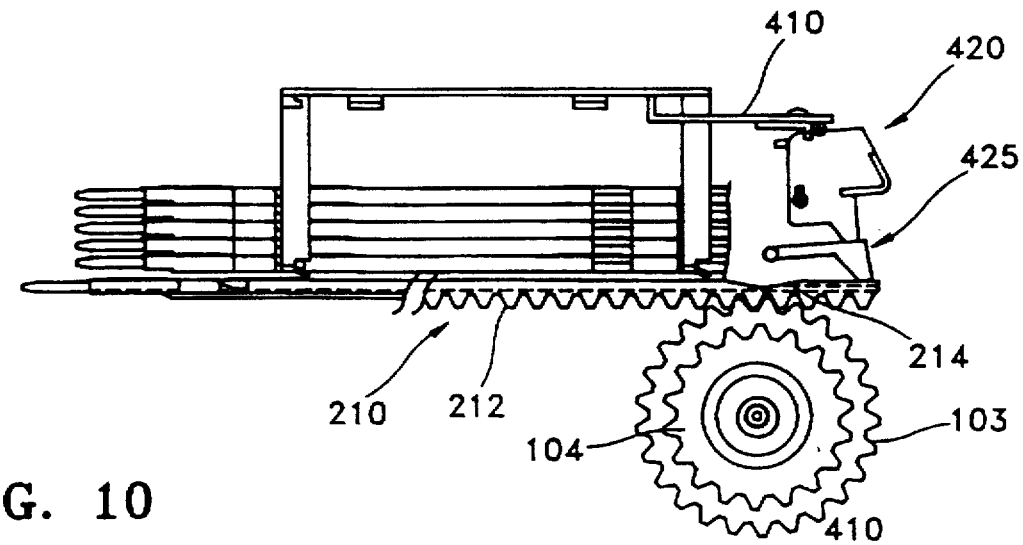
FIGS. 9 to 11 are schematic views showing the operation of the lifting means depending on the movement of the moving member shown in FIG. 8.

In this state, the main tray 200 (FIG. 1) enters the housing 100 by the driving force of the motor 101. At this time, the first gear 103 engages with the rack gear 206 (FIG. 4) of the main tray 200, when the second gear 104 races. At this stage, when the engaging member 425 slides and contacts the upper surface of the moving member 210 as shown in FIG. 9, the rotating body 420 is rotated counterclockwise to thereby move the support plate 500 so that the subtrays 310 positioned over the entering subtray 310' are lifted as shown in FIG. 2B. Thus, a space between the lifted subtrays 310 and the base portion 300a of the stocker 300 is formed so that the subtray 310' can be entered therein.

When the main tray 200 has nearly completed its entry, the releasing pin 222 (FIG. 5) of the moving block 220 slides on the sloped surface 105a of the fixing protrusion 105 to thus release the locking of the moving member 210. At the same time, the pivoting lever 230 is rotated by the torsion spring 233 and thus locked to the locking projection 105b, whereby the main tray 200 is locked into the housing 100.

Figure 10:
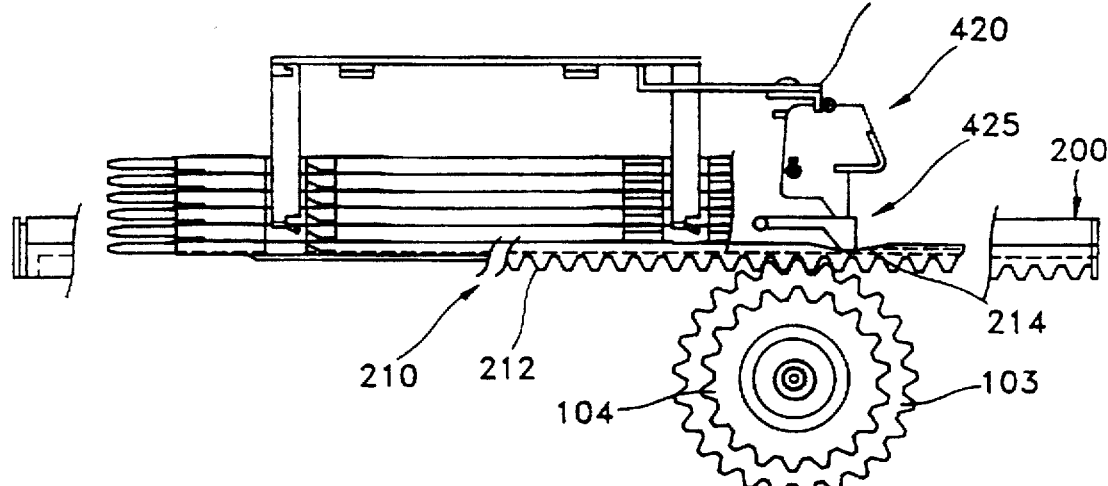

With the main tray 200 locked into the housing 100 as described above, the first gear 103 is separated from the rack gear 206 of the main tray 200, and the second gear 104 comes into engagement with the rack gear portion 212 of the moving member 210. At this time, the subtray 310' retained by the main tray 200 separates from the main tray 200. Also, as shown in FIG. 10, the engaging member 425 is located on the recessed portion 214 of the moving member 210 so that the support plate 500, as shown in FIG. 2A, is restored to the original position to thereby pile the lifted subtrays 310 on the upper surface of the entered subtray 310'.

Referring to FIG. 4, the rack gear 206 is partially formed on the arm portion 202 of the main tray 200. Also, the length of the moving member 210 is shorter than that of the arm portion 202 of the main tray 200. Thus, the rack gear 206 of the main tray 200 is separated from the first gear 103, and, at the same time, the rack gear 212 of the moving member 210 is engaged with the second gear 104.

At this time, the moving member 210 is moved slightly toward the inside of the housing 100 by the driving force of the motor 101. Thus, as shown in FIG. 4, the combining projection 314 of the subtray 310' supported on the main tray 200 separates from the support groove 203', and the projections 312 and 313 thereof separate from the support projections 201' and 202'. The subtray 310' is in the receiving position of the stocker 300.

As described above, while one subtray 310' combined with the main tray 200 is received into the stocker 300, the clutch gear 261 (FIG. 7) comes into engagement with the second connecting gear 171 by the clutch means which is operated by the driving force of the motor 101.

Meanwhile, the stocker 300 moves upward and downward by the elevating means to place the subtray 310' (FIG. 16) having a selected disk loaded thereon on the same plane with the main tray 200. The motor 101 comes to a standstill during the operation of the elevating means. The subtrays 310 received in the stocker 300 during the elevating of the stocker 300 are guided in upward and downward directions by the extended protrusions 405 and 406 (FIG. 1) and combining protrusions 407 and 408 of the fixed plate 400 and the auxiliary protrusion 116 of the first and second chassis members 110 and 120. Thus, the subtrays 310 are prevented from separating from the stocker 300.

Meanwhile, when the elevating stocker 300 stops at a predetermined position, the selected subtray 310' is placed between the first and second posts 144 and 409.

Here, the clutch and elevating means operate as follows. Referring to FIGS. 1 and 7, when the cam gear 243 is rotated by the driving force of the motor 101, the slide plate 240 is moved toward the back of the housing 100 and the link member 250 is moved toward the first chassis member 110. At this time, the elevating member 262 is pressed down by the extended plates 252 and 253 of the link member 250 and thus descends. Thus, the clutch gear 261 engages with the second connecting gear 171. Subsequently, if the motor 160 is driven, the slide member 130 moves forward and backward to thus raise and lower the stocker 300. If the selected subtray 310' is placed on the same plane as the main tray 200 as above, the motor 160 comes to a pause.

Next, if the motor 101 is driven, the link member 250 is moved toward the second chassis member 120. At this time, the elevating member 262 is moved up by the restoring force of the spring 264. Thus, the clutch gear 261 engages with the first connecting gear 181. At this time, the cam member 141 is driven by the motor 160. Accordingly, the subdeck 150 is pivoted upward. At the same time, the moving member 210 engaged with the second gear 104 is moved toward the turntable 151 by the driving force of the motor 101.

Figure 11:
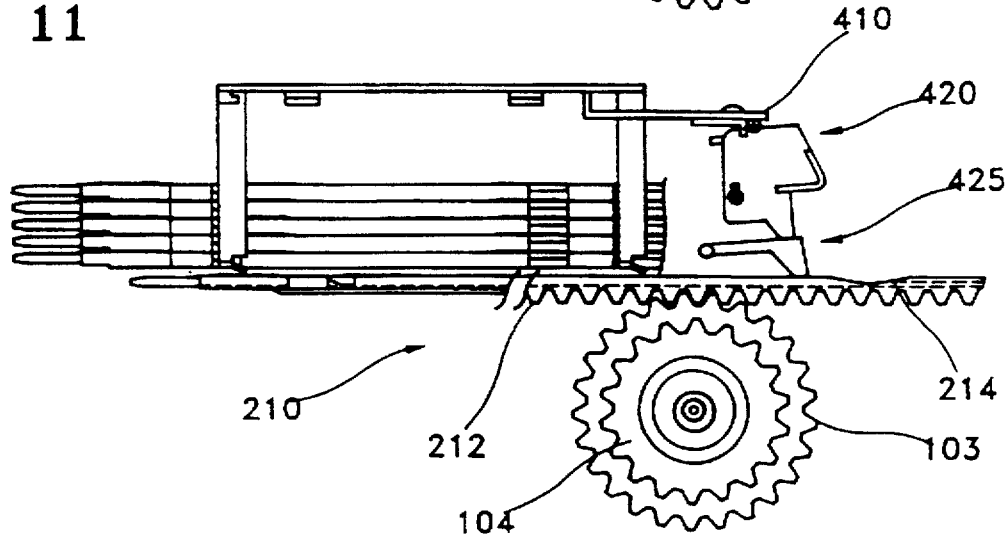

Referring to FIG. 11, when the moving member 210 moves, the engaging member 425 is pivoted upward in engagement with the upper surface of the moving member 210. Thus, as shown in FIG. 2B, the rotating body 420 and the lever member 410 are rotated so that the support plate 500 is moved. At this time, as shown in FIG. 13, each support portion 501a of the support plate 500 enters into the sloped surfaces 315a through 315d of the subtray 310. Thus, the subtrays 310 positioned on the upper portion of a selected subtray 310' are supported by the support plate 500. Also, since the auxiliary protrusions 116, 117, and 125 (FIG. 1) formed on the inner sides of the first and second chassis members 110 and 120 are combined with the respective guide grooves 315a through 315d, the subtrays 310 positioned on the lower portion of the selected subtray 310' are prevented from leaving the stocker 300.

Figure 16:
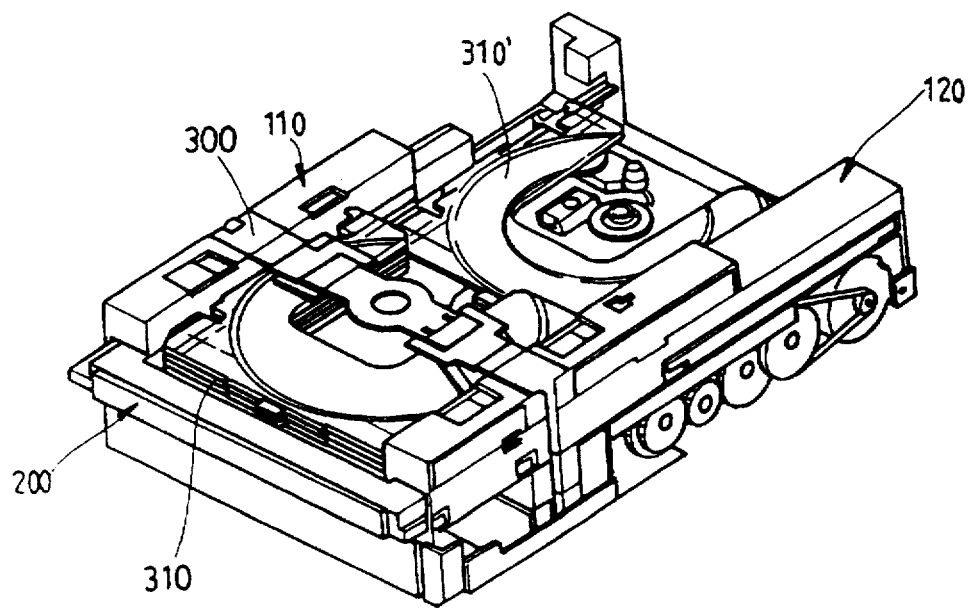
FIG. 16 is a perspective view showing the selected subtray with a disk (omitted for clarity) loaded thereon, being drawn from the stocker and moved to a reproducing position.
Figure 17:
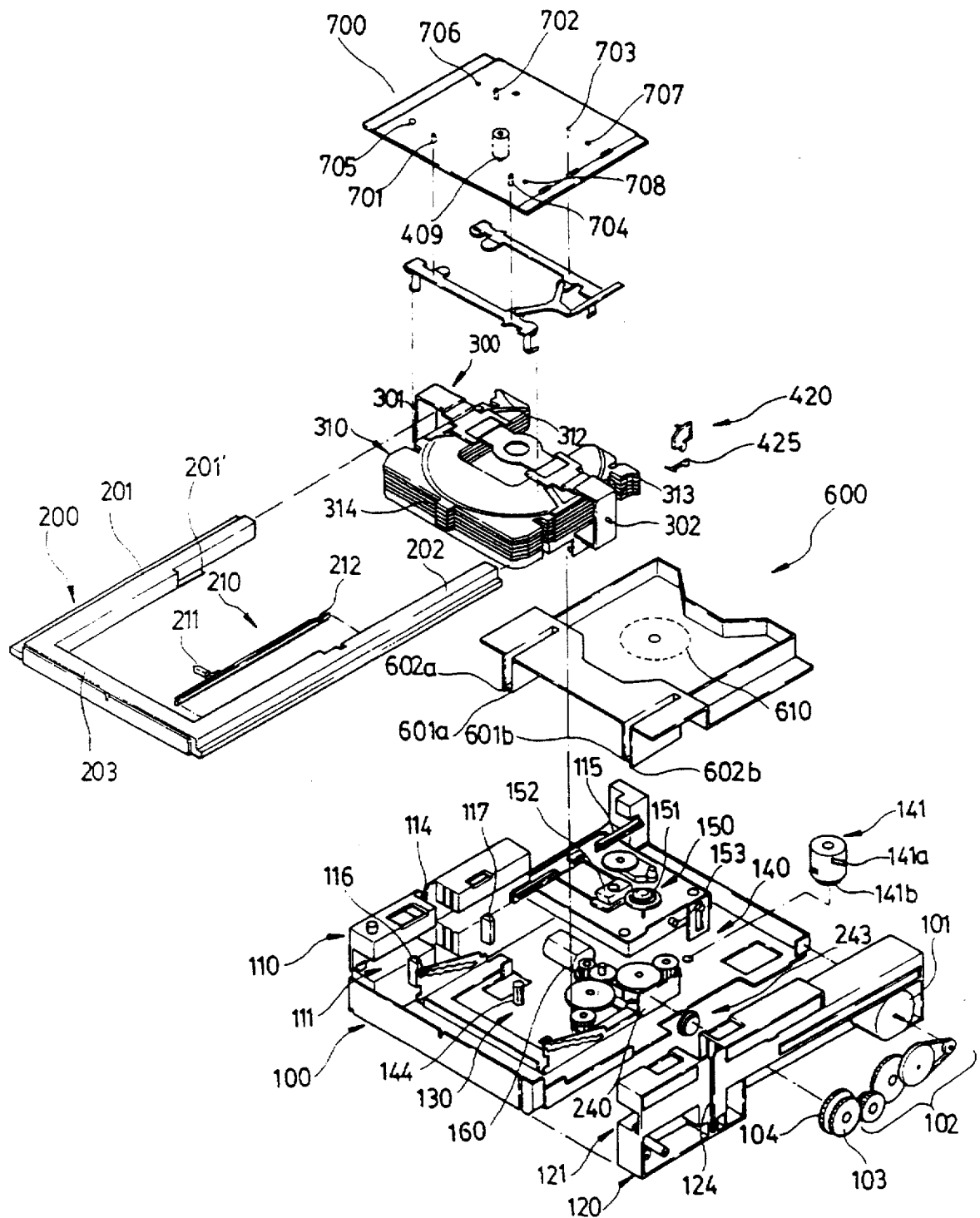
FIG. 17 is an exploded perspective view showing a disk reproducing apparatus having a disk changing function employing a lifting means for subtrays according to another embodiment of the present invention.

With the non-selected subtrays 310 supported, the selected subtray 310' is moved over the turntable 151 together with the moving member 210, as shown in FIG. 16. That is, since the protrusion 211 of the moving member 210 is combined with the guide groove 315d of the selected subtray 310' as shown in FIG. 4, the selected subtray 310' can move with the moving member 210. The selected subtray 310' which is moving is guided by the guide length grooves 318a and 318b (FIG. 3) slidably combined with the guide rail 115 (FIG. 1) formed on the first and second chassis members 110 and 120.

As above, when the selected subtray 310' is positioned over the turntable 151, the subdeck 150 pivots upward so that a disk is loaded on the turntable 151. Then, the subdeck 150 is pivoted further upward, and the disk is secured by the clamping member 610. Thereafter, the motor 160 stops driving, as the disk is reproduced by the operation of the pickup 152.

Next, the motor 101 drives the moving member 210 to move toward the stocker 300. At this time, the selected subtray 310' is restored to the stocker 300. When the engaging member 425 is placed on the recessed portion 214 of the moving member 210 as shown in FIG. 10, the rotating body 420 is restored by the torsion spring (not shown). Thus, the support plate 500 supporting the subtrays 310 positioned on the selected subtray 310' is returned to the original position, whereby all the subtrays 310 are stacked on top of one another.

Meanwhile, an action of exchanging a disk by selecting a subtray 310 other than the empty subtray during the reproduction of the disk as above is as follows.

First, the subtray 310 having a disk loaded thereon is positioned on the same level with the main tray 200 by the elevating means. Since the elevating means is operated as described above, its description will be omitted. Since the stocker 300 is placed on a different position than the reproducing position, it can move without having any connection with the reproduction of the disk.

Referring to FIGS. 1, 5, and 7, the moving member 210 engaged with the second gear 104 by the motor 101 is moved forward in the main tray 200. The pivoting lever 230 is pivoted by contacting the front edge portion of the moving member 210 which is being moved as above. At this time, the main tray 200 is released from the housing 100. Then, the locking protrusion 221 of the moving block 220 is combined with the locking groove 213 of the moving member 210. Thus, the moving member 210 is locked to the main tray 200. In this state, the rack gear 212 of the moving member 210 is separated from the second gear 104, and, at the same time, the rack gear 206 of the main tray 200 is engaged with the first gear 103.

Meanwhile, during the moving operations of the moving member 210 and main tray 200, the slide plate 240 is at a standstill. That is, the cam gear 243 which is rotated by the motor 101 is raced, while being combined with the cam pin 241a of the slide plate 240.

Figure 8:
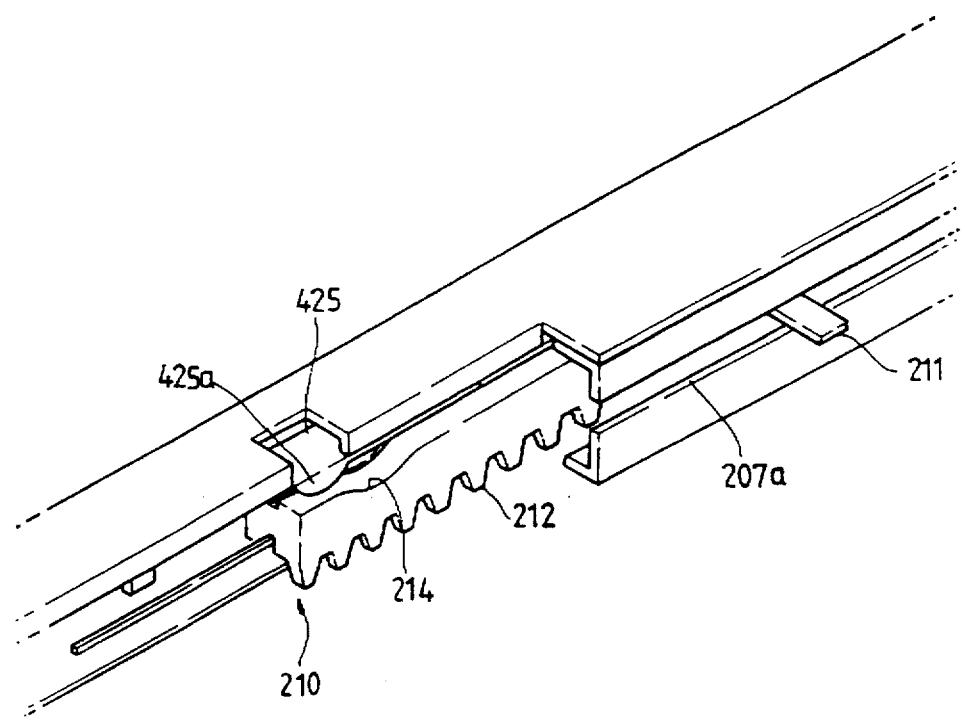
FIG. 8 is a perspective view showing the combined state of a moving member.

Referring to FIGS. 8 and 10, with the engaging member 425 positioned on the recessed portion 214 of the moving member 210, when the moving member 210 is moved to the left, the engaging member 425 is pivoted upward by the protrusion 425a leaving the recessed portion 214. Thus, the support plate 500 supports the subtrays 310 placed on the selected subtray.

In such a state, the main tray 200 is ejected from the housing 100 by the power of the motor 101 so that the exchange of disks is possible. After the disk exchange, the subtray can be placed into the stocker 300 in the reverse order of the above operation.

An operation of changing disks in the disk reproducing apparatus employing the lifting means, according to the other embodiment of the present invention will be described with reference to FIGS. 17 through 22. The apparatus operates as in the above-described embodiment except that the support bodies 850 through 880 (FIG. 18) take on the role of the support plate 500 (FIG. 1) of the above-described embodiment. Thus, the description of the operation which corresponds to the above embodiment is omitted for the sake of brevity, and the operation of the lifting means as a characteristic portion of the present embodiment will be explained.

Figure 20:
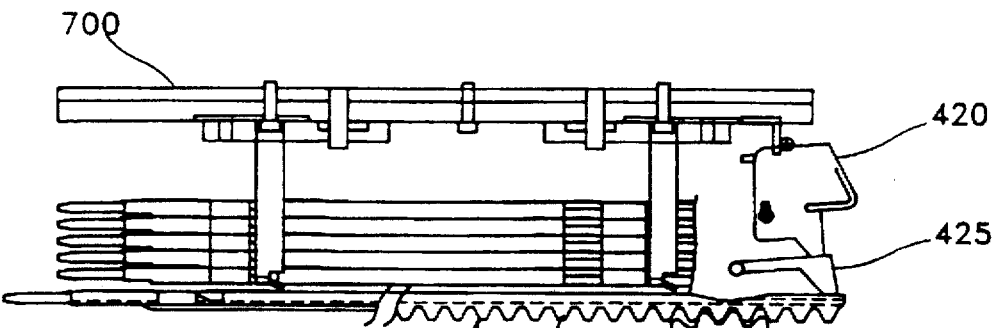
FIGS. 20 to 22 are schematic diagrams showing the operation of the lifting means of FIG. 17 depending on the movement of the moving member.

As shown in FIGS. 19A and 20, when the engaging member 425 slidably contacts the upper surface of the moving member 210 with the second gear 104 engaging with the rack gear portion 212 of the moving member 210, the rotating body 420 rotates counterclockwise to thus rotate the rotating plate 820 clockwise so that the operating plates 830 and 840 are horizontally moved in opposite directions of each other. At this time, during the rotations of the respective support bodies 850 through 880 by the interaction of the slot 832 and the eccentric pin 851b, each support portion 853 thereof goes into the bottom surface of the protrusions 317e of the subtrays 310 and thus supports the subtrays 310.

Figure 21:
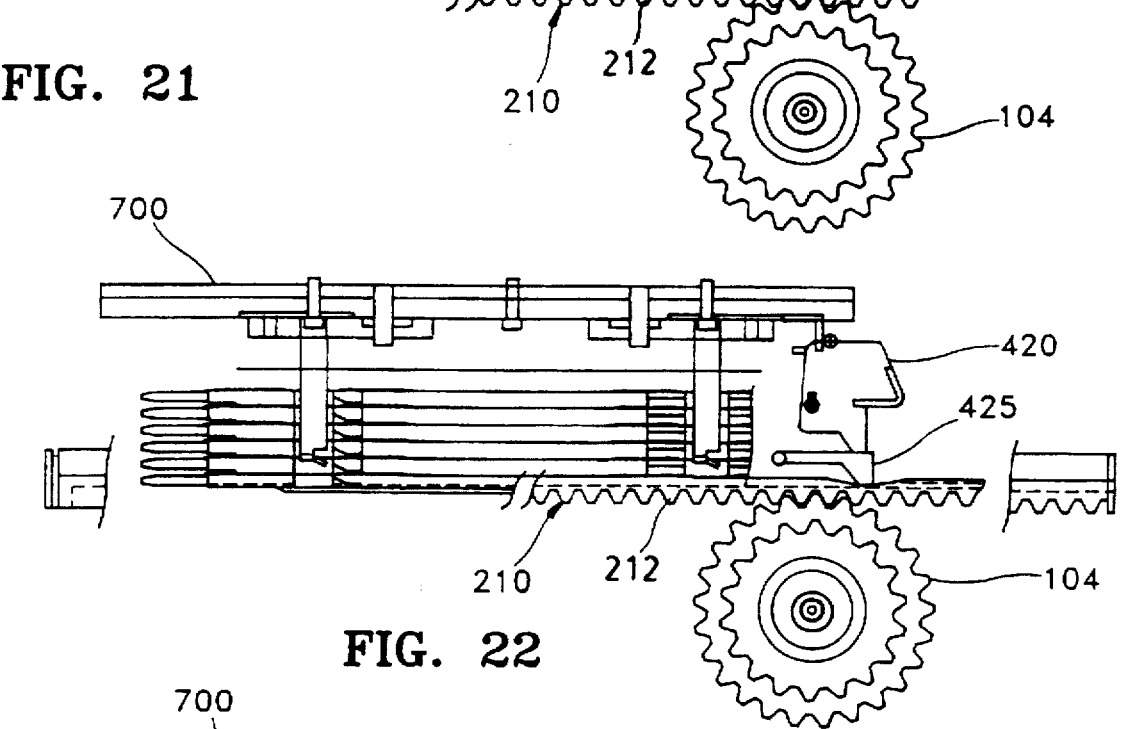

Referring to FIGS. 19B and 21, the engaging member 425 is placed on the recessed portion 214 of the moving member 210, the rotating body 420 is returned to the original position, and each support body 850 through 880 (FIG. 18) leaves the respective protrusions 317e of the subtrays 310. Thus, the lifted subtrays 310 are stacked on the upper surface of the entered subtray 310' (see FIGS. 15 and 16).

During the operation of the elevating means, the motor 101 comes to a pause. Here, during the ascent and descent of the stocker 300, the subtrays 310 received into the stocker 300 are guided upward and downward by the combining portion 852 of the support bodies 850 through 880 and the auxiliary protrusion 116 (FIG. 17) of the first and second chassis members 110 and 120. Thus, the subtrays 310 do not leave the stocker 300.

Figure 22:
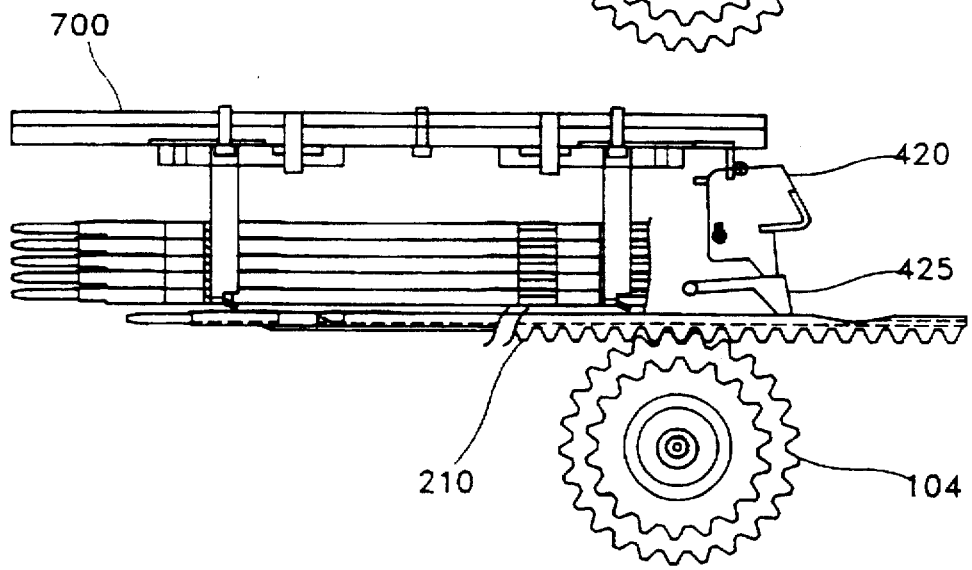

Referring to FIGS. 19A and 22, when the moving member 210 moves, the engaging member 425 is pivoted upward in engagement with the upper surface of the is moving member 210. Accordingly, the rotating body 420 and lever member 810 are rotated to move the operating plates 830 and 840 horizontally and rotate the support bodies 850 through 880. At this time, each support portion 853 of each of the support bodies 850 through 880 goes into each protrusion 317e of the subtrays 310. Thus, the other subtrays 310 positioned above the selected subtray 310' are supported by the support bodies 850 and 880.

As described above, the disk reproducing apparatus according to the present invention has such a structure that the stocker 300 is provided between a reproducing position and an ejected position out of the housing, and a disk can be moved in either direction. Also, the subtrays are received within the stocker, being slidably stacked one on top of another, which is advantageous for miniaturization of the stocker. Furthermore, when the selected subtray is moved from the stocker, the remaining subtrays above the selected subtray are lifted by the lifting means so that the selected moving subtray can be stably transported.

As described above, since the present invention has a simple structure, a plurality of subtrays can be small in size, and also move stably.

It is contemplated that numerous modifications may be made to the disk reproducing apparatus of the present invention without departing from the spirit and scope of the invention as defined in the following claims.

What is claimed is:

1. A disk reproducing apparatus having a disk changing function, comprising:

a housing having a main deck and first and second chassis members installed at either side of said main deck;

a subdeck installed on a rear side of said housing, pivotably supported at one side on said first chassis member, and provided with disk reproducing elements including a turntable for loading a selected disk thereon and an optical pickup for generating and receiving optical beams;

a plurality of subtrays positioned at a front side of said housing, and each having a loading surface on which a corresponding disk is loaded;

a stocker, for receiving said plurality of subtrays, supported on said first and second chassis members and operative to ascend and descend;

a main tray, slidably supported on said first and second chassis members, for transporting one among said plurality of subtrays to be ejected out of said housing;

first transporting means for moving said main tray;

elevating means for lifting and lowering said stocker to place a selected subtray having the selected disk loaded thereon on the same level with said main tray;

second transporting means for moving said selected subtray placed on the same level with said main tray to said turntable;

clamping means for securing the selected disk loaded on said selected subtray moved to said turntable; and means for lifting, within said stocker, any other subtrays remaining at a location above said selected subtray so as to keep said remaining subtrays from falling downward, when said selected subtray is transported to an ejected position out of said housing or onto said turntable by said first and second transporting means.

2. The disk reproducing apparatus having a disk changing function as claimed in claim 1, wherein said lifting means comprises:

a fixing plate having a plurality of guide holes, positioned on an upper side of said stocker and fixed on said first and second chassis members;

a support plate slidably installed on an upper surface of said fixing plate and having a plurality of support pieces which are respectively provided with support portions at ends thereof for supporting said subtrays, and combined with said plurality of guide holes, respectively; and manipulating means for transporting said support plate to move said support portions from a first position separated from said subtrays to a second position contacting the bottom surface of said subtrays.

3. The disk reproducing apparatus having a disk changing function as claimed in claim 2, wherein a plurality of guide grooves for receiving said plurality of support pieces are formed on each said subtray corresponding to the first position.

4. The disk reproducing apparatus having a disk changing function as claimed in claim 3, wherein sloped surfaces are respectively formed on peripheral portions of said plurality of guide grooves corresponding to the second position, and said support portions of said support pieces are formed with slant surfaces corresponding to said sloped surfaces.

5. The disk reproducing apparatus having a disk changing function as claimed in claim 2, wherein said manipulating means comprises:

a lever member pivotably supported on said fixing plate, one end of which is pivotably connected to said support plate and another end of which is placed on an upper side of said second chassis member;

a rotating body connected to the other end of said lever member and rotatably installed on said second chassis member; and rotating means for rotating said rotating body, wherein said support plate is moved by the rotation of said rotating body.

6. The disk reproducing apparatus having a disk changing function as claimed in claim 5, wherein said rotating means comprises:

a moving member having a recessed portion formed thereon, slidably combined with a first opening formed on a side portion of one side of said main tray;

moving means for moving said moving member; and an engaging member positioned on a moving course of said moving member and rotatably supported by said main tray, said engaging member having a lower surface on which a protrusion is formed for slidably contacting an upper surface of said moving member, and an upper surface on which said rotating body is contacted, wherein when said protrusion interlocks with the recessed portion of said moving member, said rotating body is rotated.

7. The disk reproducing apparatus having a disk changing function as claimed in claim 1, wherein said lifting means comprises:

a fixing plate positioned on an upper side of said stocker and fixed on said first and second chassis members;

a plurality of support bodies rotatably installed on said fixing plate and provided with support portions at respective ends thereof for supporting said subtrays; and manipulating means for rotating said support bodies to move said support portions from a first position separated from said subtrays to a second position contacting a bottom surface of said subtrays.

8. The disk reproducing apparatus having a disk changing function as claimed in claim 7, wherein a plurality of guide grooves for receiving said plurality of support bodies are formed on said subtrays and a plurality of protrusions supported by said support portions are formed on peripheral portions of said guide grooves, respectively.

9. The disk reproducing apparatus having a disk changing function as claimed in claim 8, wherein said support portions have sloped surfaces which are sloped at a predetermined angle, respectively.

10. The disk reproducing apparatus having a disk changing function as claimed in claim 8, wherein said support bodies are provided at both sides of a peripheral portion of said subtrays and wherein each support body further comprises: a fixing portion on which a centric pin rotatably combined with said fixing plate and an eccentric pin spaced apart from the rotating center are formed; and a combining portion combined with said guide grooves, and wherein said manipulating means comprises:

a pair of operating plates provided correspondingly on both side peripheral portions of said subtrays, each of said operating plates having slots which are formed perpendicular to each other for slidably combining with said centric pin and eccentric pin, respectively, said operating plates being installed so as to move in the same direction as said subtray;

a rotating plate rotatably combined with said fixing plate and rotatably connected to said respective operating plates; and rotating means for rotating said rotating plate, wherein, when said operating plates are horizontally moved by the rotation of said rotating plate, said respective support bodies are rotated so that said support portions thereof support said subtrays.

11. The disk reproducing apparatus having a disk changing function as claimed in claim 10, wherein said rotating means comprises:

a lever member one end of which is pivotably connected to said rotating plate;

a rotating body connected to another end of said lever member and rotatably installed on said second chassis member;

a moving member having a recessed portion formed thereon, slidably combined with a first opening formed on a side portion of one side of said main tray;

moving means for moving said moving member; and an engaging member positioned on a moving course of said moving member and pivotably supported by said main tray, said engaging member having a lower surface on which a protrusion is formed for slidably contacting an upper surface of said moving member, and an upper surface on which said rotating body is contacted, wherein when said protrusion interlocks with said recessed portion of said moving member, said rotating body is rotated.

12. A disk reproducing apparatus having a disk changing function, comprising:

a housing having a main deck and first and second chassis members installed at either side of said main deck;

a subdeck installed on a rear side of said housing, pivotably supported at one side on said first chassis member, and provided with disk reproducing elements including a turntable for loading a selected disk thereon and an optical pickup for generating and receiving optical beams;

a plurality of subtrays positioned at a front side of said housing, and each having a loading surface on which a corresponding disk is loaded;

a stocker, for receiving said plurality of subtrays, supported on said first and second chassis members and operative to ascend and descend;

a main tray, slidably supported on said first and second chassis members, for transporting one among said plurality of subtrays to be ejected out of said housing;

a first transporting mechanism which moves said main tray;

an elevating mechanism which lifts and lowers said stocker to place a selected subtray having the selected disk loaded thereon on the same level with said main tray;

a second transporting mechanism which moves said selected subtray placed on the same level with said main tray to said turntable;

a clamper which secures the selected disk loaded on said selected subtray moved to said turntable; and a lifting mechanism which lifts, within said stocker, any other subtrays remaining at a location above said selected subtray so as to keep said remaining subtrays from falling downward, when said selected subtray is transported to an ejected position out of said housing or onto said turntable by said first and second transporting mechanisms.

13. The disk reproducing apparatus having a disk changing function as claimed in claim 12, wherein said lifting mechanism comprises:

a fixing plate having a plurality of guide holes, positioned on an upper side of said stocker and fixed on said first and second chassis members;

a support plate slidably installed on an upper surface of said fixing plate and having a plurality of support pieces which are respectively provided with support portions at ends thereof for supporting said subtrays, and combined with said plurality of guide holes, respectively; and a manipulating mechanism which transports said support plate to move said support portions from a first position separated from said subtrays to a second position contacting the bottom surface of said subtrays.

* * * * *